(12) United States Patent
Sussman et al.

(10) Patent No.: US 12,386,718 B2
(45) Date of Patent: Aug. 12, 2025

(54) SYSTEMS AND METHODS FOR TESTING ARTIFICIAL INTELLIGENCE SYSTEMS

(71) Applicant: CBI.ai, Inc., New York, NY (US)

(72) Inventors: Edward Sussman, Gardiner, NY (US); Gil Alterovitz, Cambridge, MA (US); Walter de Brouwer, Malibu, CA (US); Michael Carlon, Port Angeles, WA (US)

(73) Assignee: CBI.ai, Inc., New York, NY (US)

( * ) Notice: Subject to any disclaimer, the term of this patent is extended or adjusted under 35 U.S.C. 154(b) by 0 days.

(21) Appl. No.: 18/827,666

(22) Filed: Sep. 6, 2024

(65) Prior Publication Data

US 2025/0077376 A1    Mar. 6, 2025

Related U.S. Application Data

(60) Provisional application No. 63/580,906, filed on Sep. 6, 2023.

(51) Int. Cl.
*G06F 11/30* (2006.01)
*G06F 11/34* (2006.01)

(52) U.S. Cl.
CPC ........ *G06F 11/302* (2013.01); *G06F 11/3452* (2013.01)

(58) Field of Classification Search
CPC ........................... G06F 11/302; G06F 11/3452
USPC ........................................................ 702/186
See application file for complete search history.

(56) References Cited

U.S. PATENT DOCUMENTS

| 7,818,646 | B1* | 10/2010 | Maly | G06F 11/26 |
| | | | | 714/724 |
| 10,956,310 | B2* | 3/2021 | Saha | G06N 3/04 |
| 2021/0034500 | A1* | 2/2021 | Budnik | G06N 3/08 |
| 2021/0303442 | A1* | 9/2021 | Chenguttuvan | G06F 11/3684 |

* cited by examiner

*Primary Examiner* — John H Le
(74) *Attorney, Agent, or Firm* — Sikander M. Khan

(57) ABSTRACT

The technology disclosed relates to a system for constructing a probeable output generative space of an agent-under-test (AUT) for a target input probe. An agent sampling logic is configured to induce an agent-under-test (AUT) to disclose a plurality of outputs in response to processing a target input probe. A space construction logic, having access to the plurality of outputs, is configured to construct a probeable output generative space based on the plurality of outputs. A space probing logic, having access to the probeable output generative space, is configured to probe the probeable output generative space for a query, and to make available results of the probing for further analysis.

14 Claims, 17 Drawing Sheets

```
batch_size = tf.shape(x)[0]
x = self.rescale(x)
patches = self.extract_patches(x)
x = self.patch_proj(patches)

class_emb = tf.broadcast_to(
    self.class_emb, [batch_size, 1, self.d_model]
)
x = tf.concat([class_emb, x], axis=1)
x = x + self.pos_emb for layer in self.enc_layers:
    x = layer(x, training)

return self.mlp_head(x[:, 0])
```

Figure 16

SYSTEMS AND METHODS FOR TESTING ARTIFICIAL INTELLIGENCE SYSTEMS

PRIORITY DATA

This application claims the benefit of and priority to U.S. Provisional Patent Application No. 63/580,906, titled "Method and Apparatus for Monitoring Artificial Intelligences," filed Sep. 6, 2023. The priority application is incorporated herein by reference in its entirety and for all purposes as if completely and fully set forth herein.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. In particular, the technology disclosed generally relates to analyzing the results of a non-determinative artificial intelligence.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Deep learning is a frontier for artificial intelligence, aiming to be closer to its primary goal-artificial intelligence. Deep learning has seen great success in a wide variety of applications, such as natural language processing, speech recognition, medical applications, computer vision, and intelligent transportation systems. The great success of deep learning is due to the larger models. The scale of these models has included hundreds of millions of parameters. These hundreds of millions of parameters allow the model to have more degrees of freedom enough to produce awe-inspiring description capability.

However, the large number of parameters requires a massive amount of training data with labels. Improving model performance by data annotation has two crucial challenges. On the one hand, the data growth rate is far behind the growth rate of model parameters, so data growth has primarily hindered the further development of the model. On the other hand, the emergence of new tasks has far exceeded the speed of data updates, and annotating for all samples is laborious.

To tackle this challenge, new datasets are built by generating synthetic samples, thereby speeding up model iteration and reducing the cost of data annotation. Pre-training methods and transfer learning have also been used to solve this challenge, such as Transformers, BERT, and GPT. These works have achieved incredible results.

However, the generated data is only used as base data to initialize the model. In order to obtain a high-precision usable model, it is often necessary to label and update specific data.

Integrating apriori knowledge in the learning framework is an effective means to deal with sparse data, as the learner does not need to induce the knowledge from the data itself. As special agents, humans have rich prior knowledge. If the machine can learn human wisdom and knowledge, it will help deal with sparse data.

Human-in-the-loop (HITL) addresses these issues by incorporating human knowledge into the modeling process. HITL aims to train an accurate prediction model with minimum cost by integrating human knowledge and experience. Humans can provide training data for machine learning applications and directly accomplish some tasks that are hard for computers in the pipeline with the help of machine-based approaches.

At present, there is still a high degree of coupling between deep learning tasks and data, and the performance of deep learning largely depends on the quality of the data. For a new task, if you want to obtain better performance, you need to provide a large amount of high-quality labeled data. However, the labeled data requires a large amount of labor. In addition, large-scale data annotation takes a long time, and many iterations of tasks cannot wait such a long time. Unlike weak annotate and automatic annotate, HITL-based methods emphasize finding the key samples that play a decisive factor in new sample data.

A core set is a weighted subset of a larger set. A core set guarantees that a model fitting the core set also fits the larger set. Core set construction methods perform importance sampling with respect to sensitivity score, to provide high-probability solutions for a particular problem, such as k-means and k-median clustering, naïve Bayes and nearest-neighbors, mixture models, low rank approximation, spectral approximation, Nystrom methods, and Bayesian inference.

Supervised learning usually requires a large set of labeled data to train the prediction model. As the learning algorithms become more and more complicated, the required size of training set gets larger and larger. Meanwhile, labeling data examples is rather expensive, because the annotation process is usually time-consuming and needs high expertise in some difficult tasks. It is thus a significant challenge to learn with insufficient labeled data.

Active learning is a primary approach to overcome this challenge. It iteratively selects the most useful examples from the unlabeled dataset to query their labels from the oracle. After adding the newly labeled data into the training set, the model can be updated to achieve better performance. The key task in active learning is how to accurately estimate the potential utility of an example on improving the performance, such that the model can be well trained with minimal queries.

Following the input of a prompt (i.e. a request or query) to a language model any specific output (i.e. the response or answer) cannot, in most circumstances, be predicted with assurance because language models are probabilistic rather than determinative devices. No single language model output is necessarily representative of other outputs to the same or similar prompts offered to the language model. This lack of certainty can be problematic because individuals, organizations, governments and society-in-general have a strong interest in knowing what information is disseminated by Generative Artificial Intelligence (AI), including the current dominant methods of Generative AI, the Large Language Model (LLM). Accurate analysis of Generative AI output is of crucial importance to society, including in the fields of academia, business, public relations and reputation, AI engineering, government regulation, politics and similar.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 16 shows example software code that implements a Transformer block.

DETAILED DESCRIPTION

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Aspects of this disclosure are directed to methods, apparatuses and recordable media for auditing an external artificial intelligence (AI). In an implementation, an apparatus includes a networked computer including a CPU, RAM, long-term storage local or cloud-based, one or more user input devices. The apparatus may include a module configured to allow access to a network wherein the network includes the World Wide Web or a similar network and wherein the module includes a network interface card or similar.

At a high level, aspects of the technology disclosed may repeatedly test an AI with the same or very similar input and ascertain whether a sufficient sample size of the non-deterministic output has been collected to generate accurate analytics. The technology disclosed ensures the sample size is representative of AI outputs to an input with a high degree of accuracy, so further analysis will also be an accurate representation of the output for an input. Other methods of testing AI output may have issues in ascertaining whether outputs represent a sufficient sample size of the AI to be representative. Other methods for querying an AI may result in an inaccurate sample size and inaccurate analysis of the input. Other methods may also result in throttling by the AI, wasted time, electricity and increased cost. For example, testing an AI too many times may cause the operator of the AI to throttle or block queries to the AI or to charge a higher fee for access. The current technology disclosed uses a new analytical module to determine when an AI has been sufficiently sampled to assure the size of the sample is sufficient to assure accurate analytics of an input but not more. This reduces the energy, cost and time required to test an AI sufficiently.

Figure 1:
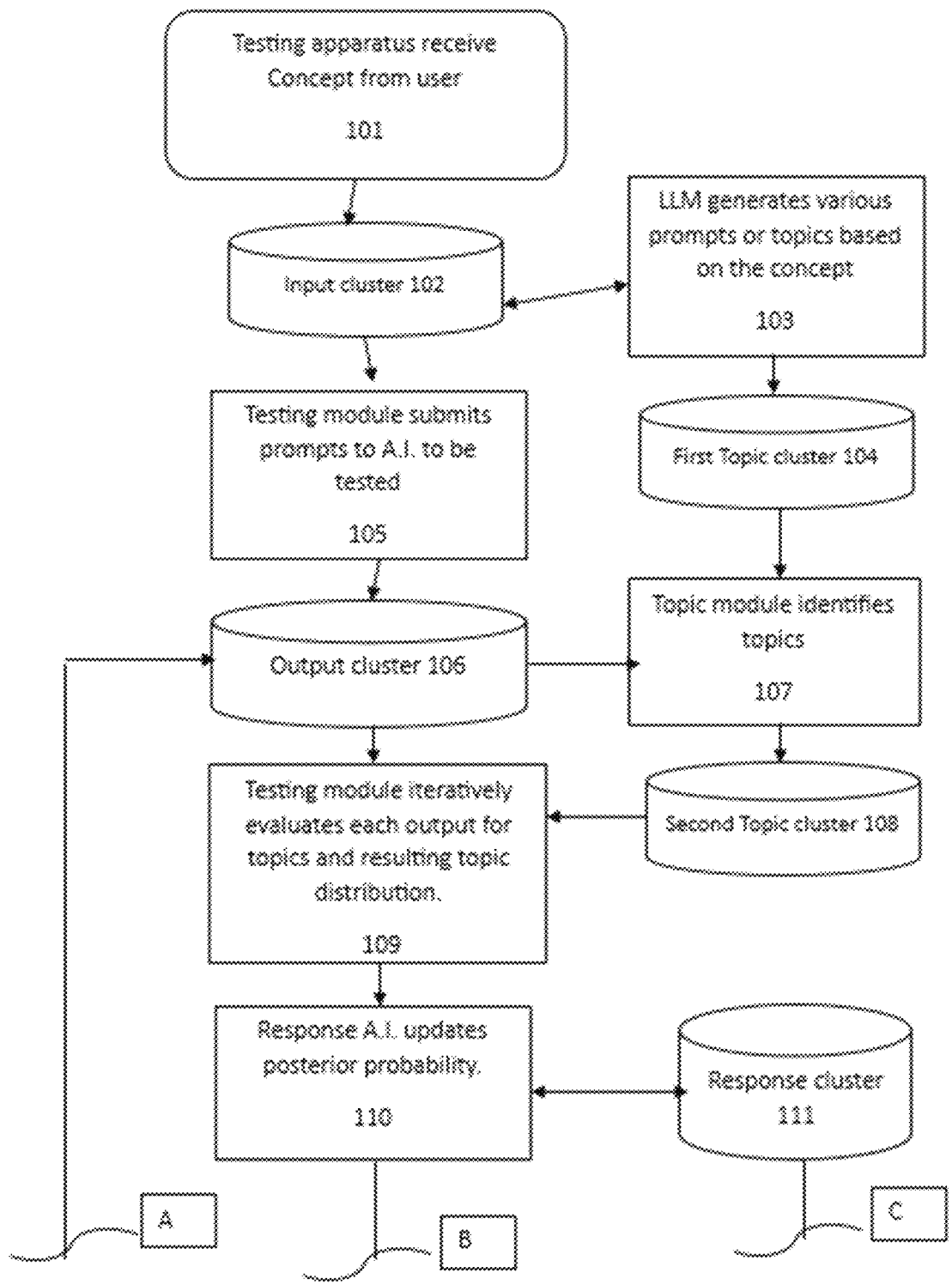
FIGS. 1, 2, 3, and 4 show various implementations of the technology disclosed.
Figure 2:
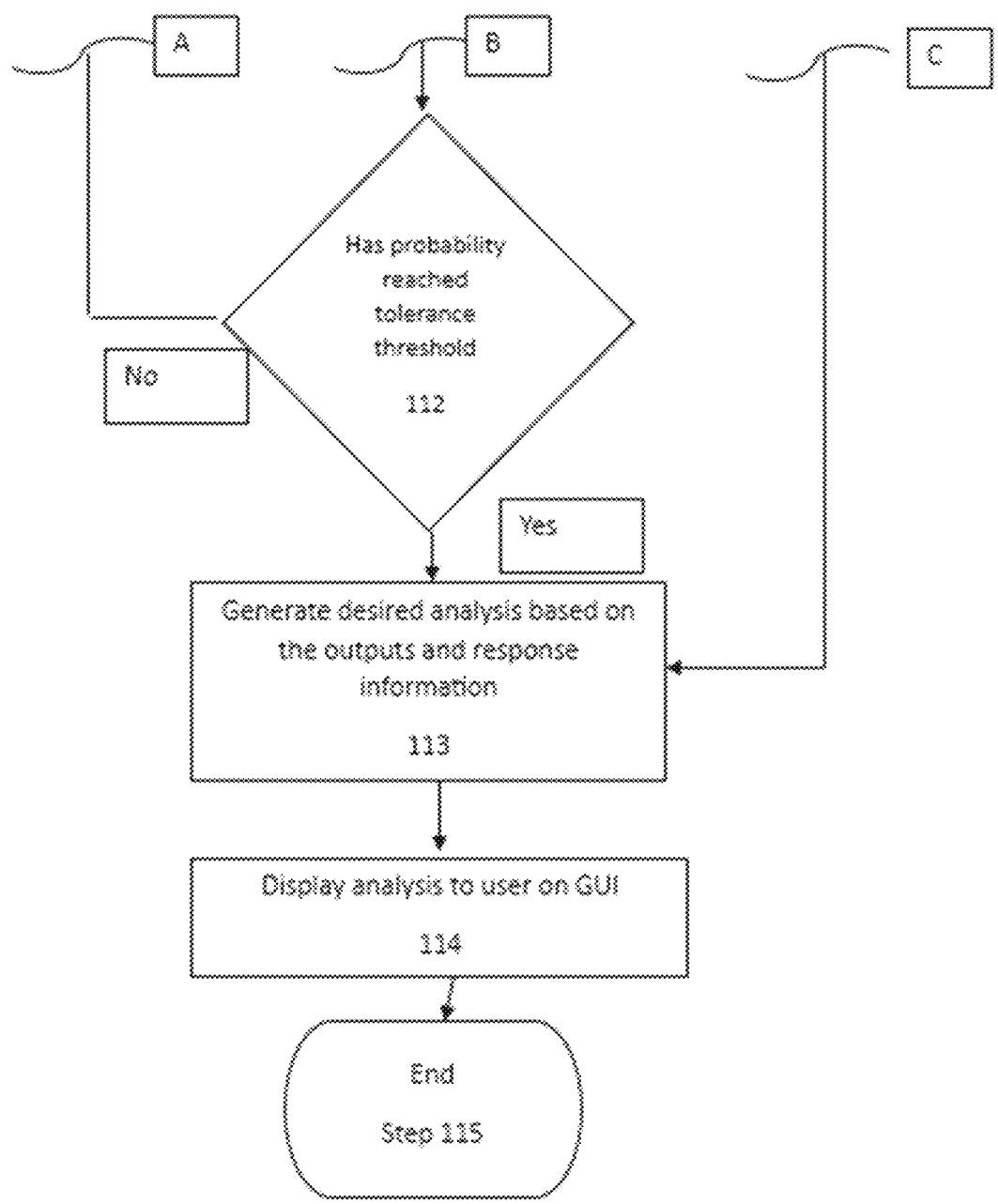

In an implementation, with reference to FIGS. 1 and 2, a user inputs a concept and keywords or topics or similar into a device for testing an AI including a large language model (LLM) 101 and the device stores them in an input cluster 102. A LLM may generate variations of prompts and topics based on the concept. The topics generated by the AI may be semantically similar or more broadly suggested by the context of the concept or concepts. 103. The generated prompts are stored in the input cluster 102 and the topics are stored in the First Topic cluster 104. A testing module 105 will submit the prompts in the input cluster 102 to the AI to be tested sequentially. The output from the AI to be tested is stored in the output cluster 106. A Topic module 107 will identify topics based on some or all the data in the output cluster. 106. 104. The topics from the First Topic cluster are integrated, and all are stored in the Second Topic cluster 108 109. As the input triggers a nondeterministic result, the resulting distribution of topics can be explored via multiple calls. The apparatus will update to create posterior probability with each call to the AI using a simulation on the same prompt. New topics are dynamically introduced as they are discovered during the sampling process. As new data is introduced, the model evaluates whether the data fits within existing topics or whether a new topic should be introduced. Once posterior probability of the topics converges to a set tolerance level, the apparatus will stop calling the AI with the specific prompt. The next prompt in the input cluster is then sent to the AI to be tested 112. When all prompts in the input cluster have been tested, the testing of the prompts is concluded for an interval. The apparatus will repeat the process for the next interval. The result of the evaluations in steps 109 and 110 are stored in the output cluster 111. Once the change to the probability after each iteration is less than a predetermined amount the iterative prompt to the AI ceases otherwise a new prompt is sent to the AI to be tested 112. The outputs stored in the output cluster 106 may be further analyzed 113. The outputs and any desired analysis are displayed to the user 114 and the process is concluded for the interval. 115. The entire process then repeats itself indefinitely for the next intervals.

For example, if a user wants to know distribution of topics for "Where is the best pizza in Manhattan?" on a popular AI used by the public, the user can input this prompt into the apparatus as the concept. The user will also input topics of interest, such as the names of local pizzerias. The apparatus will, using a LLM or similar, generate various prompts relating to this concept and submit the prompt to the AI to be tested multiple times. The outputs are collected and reviewed by the apparatus to identify topics using an LLM or similar. For example, the LLM may identify topics including styles of pizza, pizza toppings, names of restaurants that serve pizza, semantically similar versions etc. As it continues to receive iterative output, it will dynamically update itself to include any new topics. The apparatus is set to a predetermined tolerance value. For each iteration of the prompt the apparatus will query the AI multiple times and review any previous outputs based on the prompt.

The apparatus will adaptively update the likelihood of topics appearing with each prompt iteration based on previous iterations to create a posterior probability. continuing the querying and updating process until the likelihood of topic appearances stabilizes within a predefined tolerance level (e.g. the posterior probability converges to set tolerance of 1%). Then next prompt will be tested. Eventually, all the selected prompts will be tested. The process will repeat at the next intervals indefinitely. The collected information is provided to the user on an ongoing basis and the user may examine the representative sample for each interval and may draw conclusions, such as the frequency of topics. The apparatus also provides analytics of the information, such as the distribution of topics.

In an implementation, the user may input the concept 101 through multiple means. The user may input text through a physical or virtual keyboard. The user may speak their concept which is transcribed by voice recognition software. In an implementation, the user may input an image, video file, audio file or other type of file. The file is then evaluated by an AI module in the apparatus to generate prompts etc. 103.

In an implementation, the user may interact with the apparatus by adding a prompt or topic or removing a prompt or similar for testing. The prompts may be a word, a group of words, or a sentence based on the concept. An AI can analyze the one or more concepts input by the user and suggest prompts 103. The prompts generated by the AI are semantically similar. The user may accept or reject any of the prompts generated by the AI. The user may input an audio, video or text file which is then analyzed by an AI The AI then generates one or more prompts for use in the test. In an implementation, an AI may analyze an input from a user for intent. A LLM may generate closely related prompt variations for a topic. The generated prompts stored in the input cluster 102 may be related to a topic but vary in exact language. The prompt variations may be based on user intent using semantically relevant language in the concept or topics. For example, an AI may receive a voice recording, text etc. in the form of a question or tracking cookies. The AI uses these inputs to determine intent for use in the testing. The AI may access other libraries or tools in the process of generating prompts, topics or intent. For example, the AI may access a corporate database of documents or a database of the content of the internet.

In an implementation, the apparatus accesses the input cluster 102 and inputs each prompt or similar into the AI to be tested 105. The AI to be tested will generate an output based on each input. AIs are non-deterministic devices; accordingly, the output is not always the same or responsive to the input. The apparatus may use a built-in LLM or a separate response AI to determine if the topics in the iterative output are similar enough to generate a sufficient sample. The apparatus may apply a semantic search to the output. The semantic search may be a fuzzy logic search, conducted by an AI or similar. The degree of fuzziness may be adjusted by the user. The apparatus may apply fuzzy logic to associate keywords with topics, or topics with topics. The degree of fuzziness may be adjusted by the user. The apparatus may use a commercially available AI such as Azure AI by Microsoft Corporation, GPT-4o by OpenAI, Inc. or a similar in-house trained AI for the response AI. The apparatus provides the response AI with input and output of the AI to be tested for each query to determine if the topics in the iterative output are similar enough to generate a sufficient sample size.

In an implementation, the apparatus generates topics which are used to evaluate the output from the AI to be tested. In an implementation, after receiving the concept 101 the apparatus, using an LLM or similar, may generate various prompts based on the concept 103. The apparatus may also generate topics based on the concept or the prompts. 103 The resulting topics are then stored in the first topic cluster 104. The apparatus then submits the prompts to the AI to be tested 105 and the resulting output is stored in the output cluster 106. The contents of the output cluster are reviewed by the Topic module and topics are identified 107. The topics generated by the topic module 107 and the topics previously stored in the first topic cluster 104 may be combined and stored in the second topic cluster 108. The topics are typically not available to the user but may be available. If the user has access to the topics the user can view, or add topics stored in either the first topic cluster 104 or the second topic cluster 108.

In an implementation, one or more methods may be used by the LLM determining topics 103 or the topic module 107 to sample the output for topics until it has enough data to stop sampling for the interval. For example, the topic module 107 or the LLM generating topics 103 may use a Dirichlet Process (DP), Hierarchical Dirichlet Process (HDP) or Chinese Restaurant Process (CRP) to determine the topics. In the DP or HDP, as you sample the outputs from the AI to be tested, the DP or HDP will adjust by adding new topics as needed. The topic module 107 or the LLM determining topics 103 will stop sampling the outputs when the posterior distribution of the DP or HDP stabilizes, meaning that the process is no longer introducing significant new categories. The CRP operates similarly to how new categories are added in a Dirichlet Process. In practice, it means that as new samples are taken, they either join an existing category or start a new one. The topic module 107 or the LLM determining topics 103 may continue sampling the output from the AI to be tested until the rate at which new categories are being added decreases significantly, indicating that most categories have been discovered. This concludes the process for that prompt and the apparatus will repeat the process for the next prompt. When all prompts are tested, that concludes the interval, and the apparatus will begin testing for the next interval.

In an example, the topic module 107 or the LLM determining topics 103 may use a mixture model, e.g. Dirichlet Process Mixture Model (DPMM). These models allow for an unknown number of mixture topics. The model updates its posterior distribution as more outputs are observed. As the outputs from the AI to be tested are sampled, the DPMM will dynamically adjust the number of topics based on the data. Sampling can be stopped when the number of topics stabilizes, and the posterior distribution converges. This concludes the process for that prompt and the apparatus will repeat the process for the next prompt. When all prompts are tested, that concludes the interval, and the apparatus will begin testing for the next interval.

In an example, topic module 107 or the LLM determining topics 103 may use a Gibbs Sampling or Variational Inference process to determine when to stop sampling the output from the AI to be tested. Gibbs Sampling is an iterative process where each step updates the topic assignments for each data point, which then updates the posterior distribution. The topic module 107 or the LLM determining topics 103 may continue Gibbs Sampling the output until the posterior distribution of topics stabilizes, meaning that further iterations are unlikely to change the topic assignments significantly. This indicates that further sampling is unnecessary. In a Variational inference process the posterior distribution is approximated by optimizing for a lower bound. This process is faster than Gibbs Sampling. In this example, the topic module 107 or the LLM determining topics 103 may use variational inference to approximate the posterior distribution of topics in the LLM outputs. The modules stop sampling when the optimization converges, indicating that adding more samples will not significantly change the inferred topics.

In an example, topic module 107 or the LLM determining topics 103 may use a Generative Adversarial Network (GAN) to identify topics. A GAN is a pair of competing AI modules that work together to improve each other. In this example, the GAN process begins by feeding the module a small sample of outputs from the AI to be tested. A generator, integrated in the GAN module, learns to mimic the distribution of topics in these outputs, while the discriminator, integrated in the GAN module, learns to spot whether the output is real or generated. As the GAN improves by training on more outputs, it creates synthetic data that looks just like the actual LLM outputs, with the same mix of topics. The module may determine when to stop sampling the output from the AI to be tested for topics based on the performance of the GAN. If the data from the generator is so similar to the authentic data that the discriminator cannot discriminate real from fake, the GAN has learned the distribution of topics well and the apparatus may stop sampling the output for topics. Another method is to use a loss function to measure the generators performance. When the generator stops improving the apparatus can stop sampling the output for topics. This concludes the process for that prompt and the apparatus will repeat the process for the next prompt. When all prompts are tested, that concludes the interval, and the apparatus will begin testing for the next interval.

Another method uses a trained GAN. Once the GAN is trained, the topics in the synthetic data created by the generator and the topics in the real LLM outputs may be compared. If they match closely, all the topics have likely been identified, and the sampling of the AI to be tested for outputs may terminate. If the synthetic and real topics do not match more sampling may be conducted until they do. When they do, the apparatus will stop sampling, which will end the process for the prompt, and it will repeat the process for the next prompt. When all prompts are tested, that concludes the interval, and the apparatus will begin testing for the next interval.

In an implementation, the apparatus includes a module for tracking the sampling of outputs, determining topics and terminating the determination of topics when a metric stabilizes. During the determination of topics, the topics in step 103 or the topic module 107 may use one or more convergence monitoring methods. The apparatus may use posterior distribution convergence wherein the posterior distribution is updated continuously as new outputs from the AI to be tested are collected. The apparatus monitors changes in the posterior distribution of categories. When the posterior distribution stabilizes, meaning the probabilities associated with different categories stop changing significantly between successive samples, the sampling is terminated. The apparatus may use effective sample size (ESS) wherein the apparatus, including the topic module 107, measures the amount of independent information captured in the samples. ESS may measure the amount of independent information captured from a set of samples. Unlike a raw sample size, which simply counts the number of data points, ESS accounts for the fact that some samples may be more informative than others, especially when the data points are correlated. In many sampling processes, especially in methods like Markov Chain Monte Carlo (MCMC) or when dealing with correlated data, not all samples contribute equally to the estimation of the target distribution. Some samples may be very similar to others, adding little new information. ESS gives a more accurate representation of how many "independent" data points you have, which is crucial for making reliable inferences from the data. If the process of sampling the outputs shows a high ESS, it may indicate that more independent information has been collected and there is more confidence that the true distribution of topics has been captured. On the other hand, if the ESS is low, more outputs from the AI to be tested may need to be collected to ensure that the data is representative. If the ESS reaches a certain threshold, further sampling may be unnecessary. ESS may be calculated using the autocorrelation of the samples. For example, in MCMC, if the chain is highly autocorrelated (meaning each sample is very similar to the previous one), the ESS will be much smaller than the actual number of samples. A high ESS will conclude the process for the prompt and the apparatus will test the next prompt. When all prompts are tested, that concludes the interval, and the apparatus will repeat the process for the next interval.

In an implementation, the apparatus may use metrics to measure how well the topics based on the sampled outputs match an actual underlying distribution. For example, the apparatus may calculate the precision (correctly identified categories out of all identified categories) and recall (correctly identified categories out of all actual categories). The apparatus will continue to sample the output for topics until both metrics stabilize. In an example, the apparatus calculates an F1 score for the identified categories in the LLM outputs. The F1 score is a harmonic mean of precision and recall. The apparatus tracks the F1 score over successive samples and stops sampling the output when the F1 score converges (i.e., changes by less than a specified threshold) after an iteration. In an example, the apparatus may use a posterior predictive check to measure accuracy of the topics. The Posterior predictive check involves comparing a model's predictions against new samples to assess if the current model is sufficiently capturing the distribution. In this example, the apparatus uses the output of a selected model to predict new samples and compare these predictions to actual samples of output from the AI to be tested. If the predictions match closely, it suggests the model has captured the distribution well. This concludes the process for that prompt and the apparatus will repeat the process for the next prompt. When all prompts are tested, that concludes the interval, and the apparatus will begin testing for the next interval.

In an implementation, the apparatus starts to sample output and uses a Universal Index method to stop sampling when capturing a distribution involves tracking the growth of new categories in the sampled data. As the apparatus samples more outputs, it will compute an index based on the emergence of new categories. When the rate of discovering new categories slows significantly, and the index stabilizes, the distribution is likely captured, and the apparatus will stop sampling. This concludes the process for that prompt and the apparatus will repeat the process for the next prompt. When all prompts are tested, that concludes the interval, and the apparatus will begin testing for the next interval.

In an implementation, a user inputs a concept and keywords or similar into a device for testing an AI including a large language model (LLM) 101 and the device stores them in an input cluster 102. A LLM may generate variations of prompts and keywords based on the concept 103. The generated prompts are stored in the input cluster 102 and the keywords are stored in the First Topic cluster 104. A testing module 105 will submit the prompts in the input cluster 102 to the AI to be tested sequentially. The output from the AI to be tested is stored in the output cluster 106. As the input of a prompt triggers a nondeterministic result, the resulting distribution of keywords can be explored via multiple calls. The apparatus will update to create posterior probability with each call to the AI using a Monte Carlo simulation on the same prompt. Once posterior probability converges to a set tolerance level, the apparatus will stop calling the AI with the specific prompt. The posterior probability may be stored in cache for future use. The next prompt in the input cluster is then sent to the AI to be tested 112. When all prompts in the input cluster have been tested, the testing of the prompts is concluded for an interval. The apparatus will stop sampling for the interval, and it will repeat the process for the next interval.

Other methods of testing an AI will send a very large number of queries to the AI hoping to collect a representative sample. These methods have significant drawbacks. Spending too much time testing the AI may cause the testing to be detected and throttled by the operator of the AI, there is a practical cost to each query, including electricity and hardware resources, and an opportunity cost. If an insufficient number of samples are collected, subsequent analytics may be inaccurate. The current technology disclosed improves upon these methods by applying an adaptive approach to the method of testing to determine the sufficient number of queries, improving accuracy and reducing the number of resources required to test an AI In an implementation, the output may be classified with a multidimensional vector. Each vector may be directed to a different aspect of responsiveness. For example, each multidimensional vector may indicate the words used, synonyms, the word's position in the document etc. For text-based inputs and outputs the multidimensional vector may be determined by the apparatus or an AI including the responsive AI. If the input or the output includes several types of data, including audio or video, this input or output is evaluated by the apparatus and directed to a relevant responsive AI for each type of data.

In an implementation, the AI to be tested is retested multiple times. Testing the AI multiple times may provide more information and allow the user to identify changes in trends and the operation of the AI. After the test is configured by the user and successfully concludes 111, the apparatus will retest the AI periodically. For example, the apparatus could retest the AI hourly, daily, monthly, annually or another period or another type of interval specified by the user or by the apparatus.

In an implementation, the output may be displayed to the user through a graphical user interface (G.U.I.). The output from the AI to be tested and any associated analysis is stored in a response cluster 111. The information in the output database may be used to view analytics, comparison and other data visualizations. In an implementation, an analysis AI tool may generate various analytics 113. The apparatus may also alert the user of a specific result from the analytics of the AI to be tested. For example, the analysis AI tool may be prompted to identify the most representative output based on all the outputs 113 in the response cluster 111. The response cluster 111 may contain thousands of outputs making manual review impractical. The AI tool will then rank all the responses based on how representative each is of the whole 113 and then display a selection to the user in the G.U.I. 114.

In an aspect of the technology disclosed, the apparatus may determine the prevalence of specified keyword or topics in the output of the AI to be tested based on an input. The apparatus as described above is modified to measure specified qualities of each keyword or topic in the output and use this data to provide a user with more information about how the keywords or topics in the output of the AI to be tested responds to a specific input. For example, the apparatus may measure the output and determine how much of the total output is directed to a keyword or topic.

Figure 3:
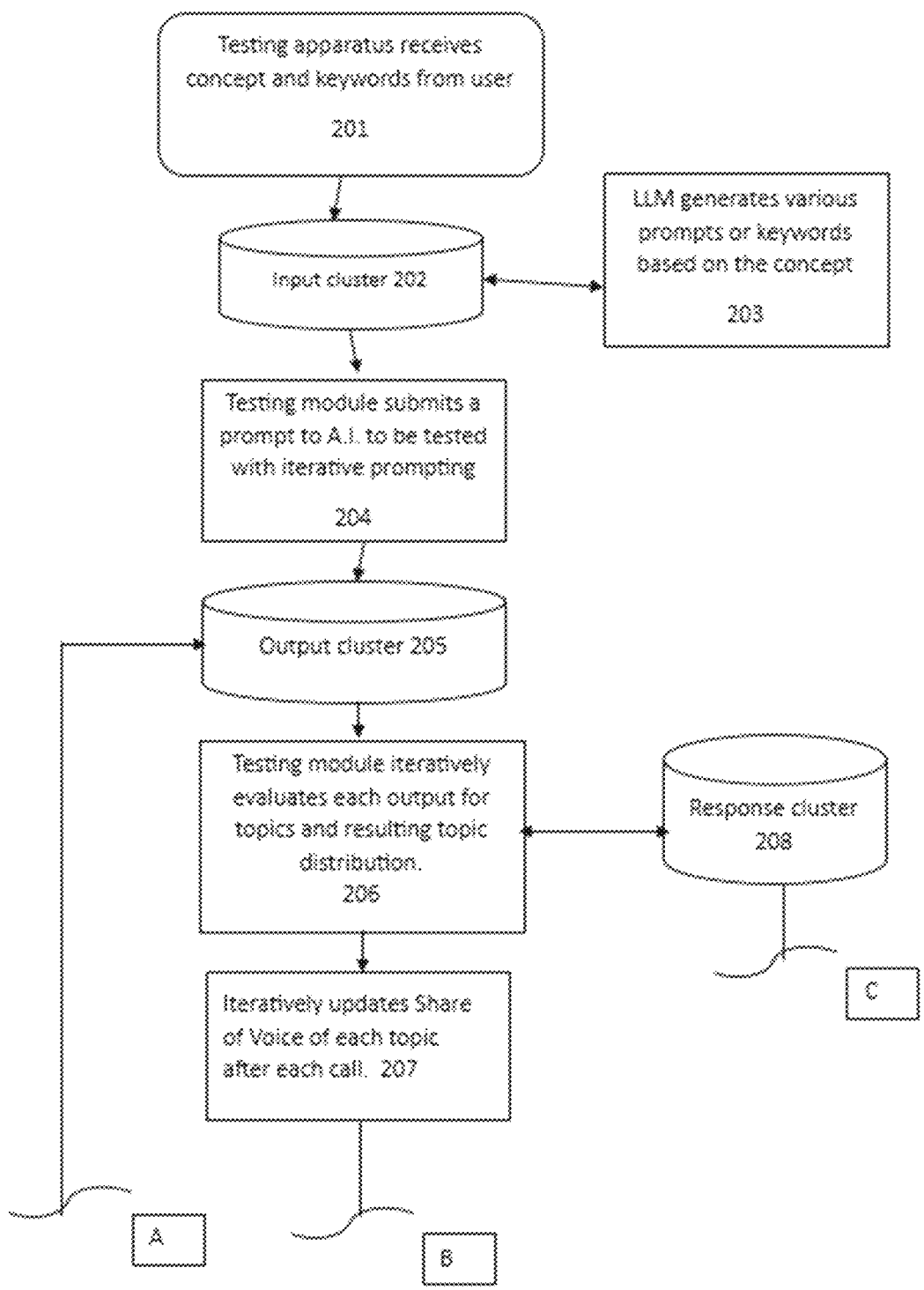
Figure 4:
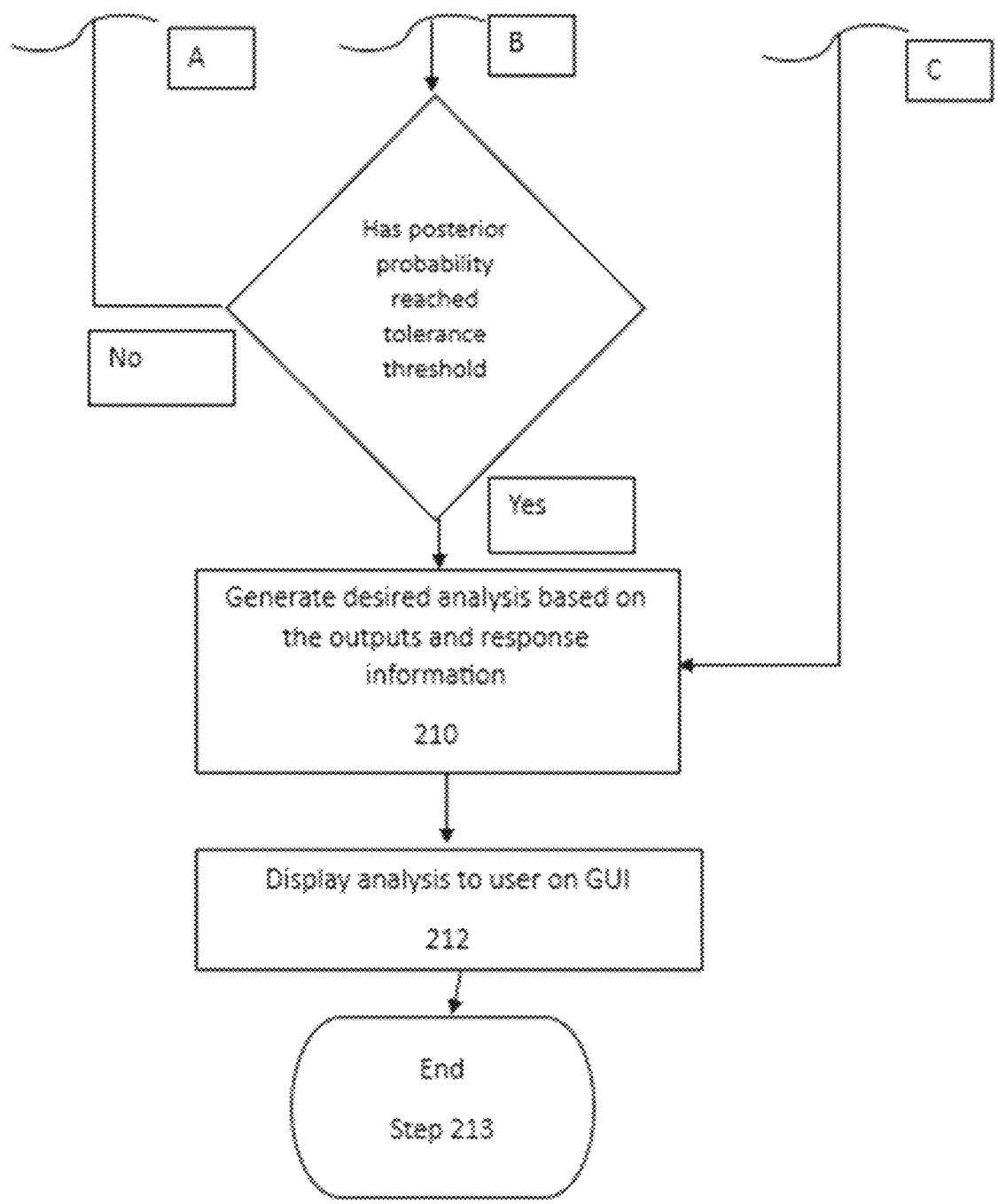

In an implementation, with reference to FIGS. 3 and 4, a user inputs concepts, keywords etc. into an apparatus for testing an external AI 201. An AI, for example an internally trained LLM, evaluates the concept and outputs additional keywords and/or topics and prompts based on the concept 203. The keywords and/or topics and prompts are stored in an input cluster 202. A testing module sequentially submits the prompts in the input cluster 202 to the AI to be tested 204. The output from the AI to be tested is stored in the output cluster 205. The apparatus collects outputs for an interval by determining whether there is sufficient iterative prompting to test using a Monte Carlo simulation whether keywords and/or topics converge on a posterior probability preset as a threshold for a prompt then stopping prompting, or by other methods of collecting a sufficient sample of output before stopping. When evaluating for share of voice the testing module considers the percentage of time that the keyword or topics appears in the outputs of the AI to be tested for a given prompt and the percentage of time the keyword or topic appears in the output for all prompts. The result of the evaluation is stored in the response cluster 208. The testing module updates the posterior probability of the keywords or topics in an output for each call to the AI using a Monte Carlo simulation or other methods of collecting a sufficient sample of the of output before stopping. 207. Once the change to the posterior probability of the keywords or topics in iterative outputs is less than a preset threshold, the iterative prompt to the AI to be tested ceases and a new prompt is sent to the AI to be tested 209. The stored outputs 205 and the stored evaluations in Response cluster 208 may be further analyzed 210. The outputs and any desired analysis are displayed to the user 212 and the process is concluded for the interval. The apparatus then repeats the process for the next interval. 213. The user may use this information to identify trends including in AIs that are updated over time (e.g. days, weeks or months) or including in AIs the iteratively test a high number of intervals.

In an implementation, the user may input the concept 201 through multiple means. The user may input text through a physical or virtual keyboard. The user may speak their concept which is transcribed by voice recognition software. In an implementation, the user may input an image, video file, audio file or other type of file. The file is then evaluated by an AI module in the apparatus to generate keywords prompts etc. 203.

In an implementation, the user may interact with the apparatus by inputting a keyword or similar for testing 201. The keyword may be a word, a group of words, or a sentence based on the concept. An AI can analyze the one or more concepts input by the user and suggest keywords. The keywords generated by the AI may be semantically similar or more broadly suggested by the received concepts. The user may input an audio, video or text file which is then analyzed by an AI. The AI then generates one or more keywords for use in the test. In an additional implementation, an AI may analyze an input from a user for intent. For example, an AI may receive a voice recording, text etc. in the form of a question or tracking cookies. The AI uses these inputs to determine intent for use in the testing. The AI may access other libraries or tools in the process of generating keywords or intent. For example, the AI may access a corporate database or a database of the entire internet.

In an implementation, the apparatus accesses the input cluster 202 and inputs each prompt into the AI to be tested. The AI to be tested will generate an output based on each prompt. AIs are non-deterministic devices; accordingly, the output is not always the same or responsive to the input. The apparatus may use a built-in LLM or an external response AI to determine if the output is of a sufficient sample size. The apparatus may use a commercially available AI such as Azure AI by Microsoft Corporation, GPT-4o by OpenAI, Inc. or a similar in-house trained AI for the response AI. The apparatus provides the response AI with the prompt and output of the AI to be tested for each query. The apparatus indicates if the sample size of the outputs is sufficient by iteratively testing the occurrence of keywords or topics in outputs until the posterior probability converges to below a set tolerance, or by another method for collecting a sufficient sample of output before stopping.

In an implementation, the apparatus calculates the probability of the keywords or topics in an output by dividing the number keywords or topics in output by the total number of keywords or topics in the output for all queries 206. This probability is updated as a posterior probability after each query of a prompt to the AI to be tested 206. The change in posterior probability is compared to the tolerance level after each query 209. If the change in posterior probability is greater than the tolerance level another query is initiated 209. If the change in posterior probability level is less than the tolerance level the query process is terminated 209. The tolerance level is a predetermined value set for the apparatus. The tolerance level may be set by the user.

In an implementation, the output may be classified with a multidimensional vector. Each vector may be directed to a different aspect of responsiveness. For example, each multidimensional vector may indicate the words used, synonyms, the word's position in the document etc. For text-based inputs and outputs the multidimensional vector may be determined by the apparatus or an AI including the responsive AI. If the input or the output includes several types of data, including audio or video, this input or output is evaluated by the apparatus and directed to a relevant responsive AI for each type of data.

In an implementation, the AI to be tested is retested multiple times. Testing the AI multiple times may provide more information and allow the user to identify changes in trends and the operation of the AI. After the test is configured by the user and successfully concludes 111, the apparatus may retest the AI periodically. For example, the apparatus could retest the AI hourly, daily, monthly, annually or another interval specified by the user.

In an implementation, the output may be displayed to the user through a graphical user interface (G.U.I.) 212. The output from the AI to be tested and any associated analysis is stored in a response cluster 208. The information in the output database may be used to view analytics, comparison and other data visualizations. In an implementation, an analysis AI tool 210 may generate various analytics. For example, the analysis AI tool may be prompted to identify the most representative output based on all the outputs 210 in the response cluster 208. The response cluster 208 may contain thousands of outputs making manual review impractical. The AI tool will then rank all the responses based on how representative each is of the whole and then display the outputs or a selection to the user in the G.U.I. 211.

In an implementation, the apparatus evaluates the share of voice percentage for a keyword or topic. A keyword or topic is a word, phrase, semantically similar variations or similar, that may be selected for review by a user or the apparatus. A testing module 206 begins evaluating the percentage for each input by setting the percentage to a predetermined value based on a uniformed prior or by reviewing historical searches, user experiences or similar. The apparatus indicates if the sample size of the outputs is sufficient by iteratively testing the occurrence of keywords or topics in outputs until the posterior probability converges to below a set tolerance, or by another method for collecting a sufficient sample of output before stopping. A share of voice percentage testing module calculates the percent of the time that each topic appears in the total output for a given prompt and the percent of the time that each topic appears in the outputs for all prompts. The apparatus may calculate the interquartile and outlier information for the user on each keyword or concept. The semantic similarity of the keyword to another keyword or topic selected by the LLM may be determined by a module using fuzzy logic or an AI. The degree of fuzziness may be selected by the user. A G.U.I. may display to the user a distribution showing the percentage that an output related to a keyword is found in the output 213. The apparatus may also alert the user of a specific result from sampling the AI to be tested An AI may be provided categories to indicate the degree of semantic similarity to a keyword or topic/210. For example, an AI may be prompted to assign a category of none, sparce, partial or extreme for each keyword or topic. The categories of none and sparce may be less semantically similar to the keyword. The categories partial and extreme may be associated with more semantically related or exact phrase matches to the keyword. The apparatus may display via a GUI the degree of semantic similarity of a keyword or topic to its actual wording in the text of an output.

For example, if a user wants to know what the common responses are when an AI receives the concept "Where is the best pizza in Manhattan?" the apparatus will apply a share of voice percentage method. The apparatus may generate multiple keywords or topics and prompts based on the concept. The apparatus will poll the outputs of the AI to be tested using the method described above or a similar method. The testing module calculates a share of voice percentage as the percent of the time that a keyword or topic appears in the total output for a given prompt and the percent of the time that a keyword or topic appears in the outputs for all prompts. The testing module may do this for multiple prompts. In an example, the testing module may determine that the topic "a classic New York slice" appears in 5% of outputs, the topic of a specific restaurant A appears in 10% of outputs and the topic of a specific restaurant B appears in 20% of outputs. This test can also be performed over time so the apparatus can display changes in the percentage of time a keyword or topic appears in the outputs over time as the AI to be tested changes.

In an implementation, the apparatus evaluates the share of voice percentile for a keyword or topic. A keyword or topic is a word, phrase, semantically similar variations or similar, that may be selected for review by a user or the apparatus. A testing module 206 begins evaluating the percentile for each input by setting the percentile to a predetermined value. This predetermined value may be set by the apparatus as a uniformed prior or by reviewing historical searches, user experiences or similar. Each time the apparatus queries the AI to be tested for the outputs using the method described above or similar. In this analysis, the apparatus will measure the number of words until each keyword first appears in the output of the AI divided by the total words in the output for a given prompt and the number of words until each keyword first appears in the output of the AI divided by the total words in the output for all promptst.206. The percentile is updated to reflect the percentile of the output scanned divided by the words or phrases encountered in the output that are responsive to the input 207. The percentile is also updated for each of the variations of the prompt. The share of voice percentile is the number of words until the keyword or topic first appears in the output of the AI to be tested divided by the total words in the output for a given prompt and the number of words until the keyword or topic first appears in the output of the AI divided by the total words in the output for all prompts. As each input of the prompt into the AI to be tested has a nondeterministic output the resulting distribution may be explored with multiple calls to the AI. The posterior probability is updated with each query to the AI to be tested using a Monte Carlo simulation for each prompt. Once the posterior probability converges to set tolerance the apparatus will stop querying the AI with the same prompt. The AI may be prompted to assign a category of none, sparce, partial or extreme to each output for each keyword used. A G.U.I. may display to the user a distribution showing the percentage that an output related to a keyword is found in the output. The apparatus may also alert the user of any outputs from sampling the AI to be tested.

In an implementation, the apparatus evaluates the voice dominance percentage for a keyword or topic, the context surrounding the keyword or topic, and the content related to the keyword or topic. A keyword or topic is a word, phrase, semantically similar variations or similar, that may be selected for review by a user or the apparatus. A testing module 206 begins evaluating the share of voice dominance for each prompt by setting the initial percentage of the share of voice dominance for each keyword to a predetermined value. This predetermined value may be set by the apparatus with a uniformed prior or by reviewing historical searches, user experiences or similar. As each input of the prompt into the AI to be tested has a nondeterministic output the resulting distribution may be explored with multiple calls to the AI. The posterior probability is updated with each query to the AI to be tested using a Monte Carlo simulation for each prompt. Once the posterior probability converges to a set tolerance, the apparatus will stop querying the AI with the same prompt. A share of voice dominance testing module determines the dominance of a keyword or topic by identifying the language corresponding to a keyword or topic and the keyword or topic intent within the outputs of a prompt; the module determines keyword or topic intent by identifying the language and images corresponding to a keyword or topic and their corresponding intent in the outputs for a prompt or in all outputs for all prompts. The module calculates share of voice dominance as a percentage of the keyword or topic correspondence to the language in the output and keyword or topic intent in the output of a prompt and as percentage of the keyword or topic correspondence to the language in the output and the keyword or topic intent in the outputs of all prompts. For example, the apparatus may determine whether a word or phrase is more dominant in a document if corresponding language to the word or phrase, and language associated with the intent of the word or phrase appears more in the document. This information may be used to determine the dominant percentage of the outputs directed to a keyword or similar.

In an implementation, the apparatus evaluates the share of voice proportion for a keyword or topic. A keyword or topic is a word, phrase, semantically similar variations or similar, that may be selected for review by a user or the apparatus. A testing module 206 begins evaluating the proportion for each input by setting the proportion to a predetermined value. This predetermined value may be set by the apparatus as a uniformed prior or by reviewing historical searches, user experiences or similar. Each time the apparatus queries the AI to be tested for the outputs using the method described above or similar. In this analysis, the testing module calculates the proportion for each topic by determining the proportion of time the topic appears in the outputs relative to the total occurrences of all topics for the outputs for a prompt and/or calculates the proportion of time the topic appears in the outputs relative to the total occurrences of all topics for the outputs of all prompts; outputs an information based on the posterior probability of the specific result and the proportion of specific topics. 207. The proportion is also updated for each of the variations of the prompt. The share of voice proportion for each topic is the proportion of time the topic appears in the outputs relative to the total occurrences of all topics for the outputs for a prompt and/or the proportion of time the topic appears in the outputs relative to the total occurrences of all topics for the outputs of all prompts; As each input of the prompt into the AI to be tested has a nondeterministic output the resulting distribution may be explored with multiple calls to the AI The posterior probability is updated with each query to the AI to be tested using a Monte Carlo simulation for each prompt. Once the posterior probability converges to set tolerance the apparatus will stop querying the AI with the same prompt. The AI may be prompted to assign a category of none, sparce, partial or extreme to each output for each keyword used. A G.U.I. may display to the user a distribution showing the proportion that an output related to a keyword or topic is found in the output and/or the proportion of time the topic appears in the outputs relative to the total occurrences of all topics for the outputs of all prompts. The apparatus may also alert the user of any outputs from sampling the AI to be tested.

In an implementation, evaluating whether an output is associated with a keyword or topic may be accomplished with an LLM or a module integrated with the apparatus. For example, when using an LLM a user may request a keyword or topic relating to "cheese pizza" and the LLM will review the outputs stored in the response cluster 209 select the outputs it determines are related to "cheese pizza." What is related could be a transposed letter, spelling mistake, synonym or a word or phrase that is related to the request. This LLM may be integrated into the apparatus, or it may be an external commercially available LLM. In an implementation, a module integrated in the apparatus uses fuzzy logic to evaluate the outputs in the response cluster 209 for a specific result. In this example, when a user requests outputs relating to "cheese pizza" the module will use fuzzy logic to select outputs it determines are related to the request. What is related could be a transposed letter, spelling mistake, synonym or a word or phrase that is related to the request. The degree of fuzziness may be selected by the user.

In an implementation, the apparatus performs a sentiment analysis of the output from the AI to be tested. A sentiment analysis LLM receives an output from the response cluster 109. The sentiment analysis LLM reviews the output and applies a sentiment score to the keywords or topics in the output. The information from the sentiment analysis LLM may be stored in the response cluster 109. The sentiment analysis LLM may analyze all the outputs in the response cluster 109 or a portion thereof. The portion may be selected by the user. The sentiment analysis LLM may be integrated into the apparatus or may be an external commercially available AI. In an implementation, the sentiment analysis LLM is prompted to give a numerical score to the keywords or topics output indicating the least to most positive. In an implementation, the sentiment analysis LLM is prompted to give an output a discrete sentiment grade for each keyword or topic. For example, the output may receive a positive, neutral or negative grade.

Referring again to FIGS. 1 through 4, the diagrams in the figures illustrate the architecture, functionality, and operation of possible implementations of systems, methods and computer program products according to various implementations of the technology disclosed. In this regard, each block in a flowchart or a block diagram may represent a module, segment, or portion of code, which comprises one or more executable instructions for implementing the specified logical function(s). It should be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, implementations of the technology disclosed, for example, as depicted in FIGS. 1-4, can also include, as described herein, providing a system, wherein the system includes distinct modules (e.g., modules comprising software, hardware or software and hardware). By way of example only, the modules may include, but are not limited to, the Large Language Models. These and other modules may be configured, for example, to perform the steps described and illustrated in the context of FIGS. 1-4.

Figure 5:
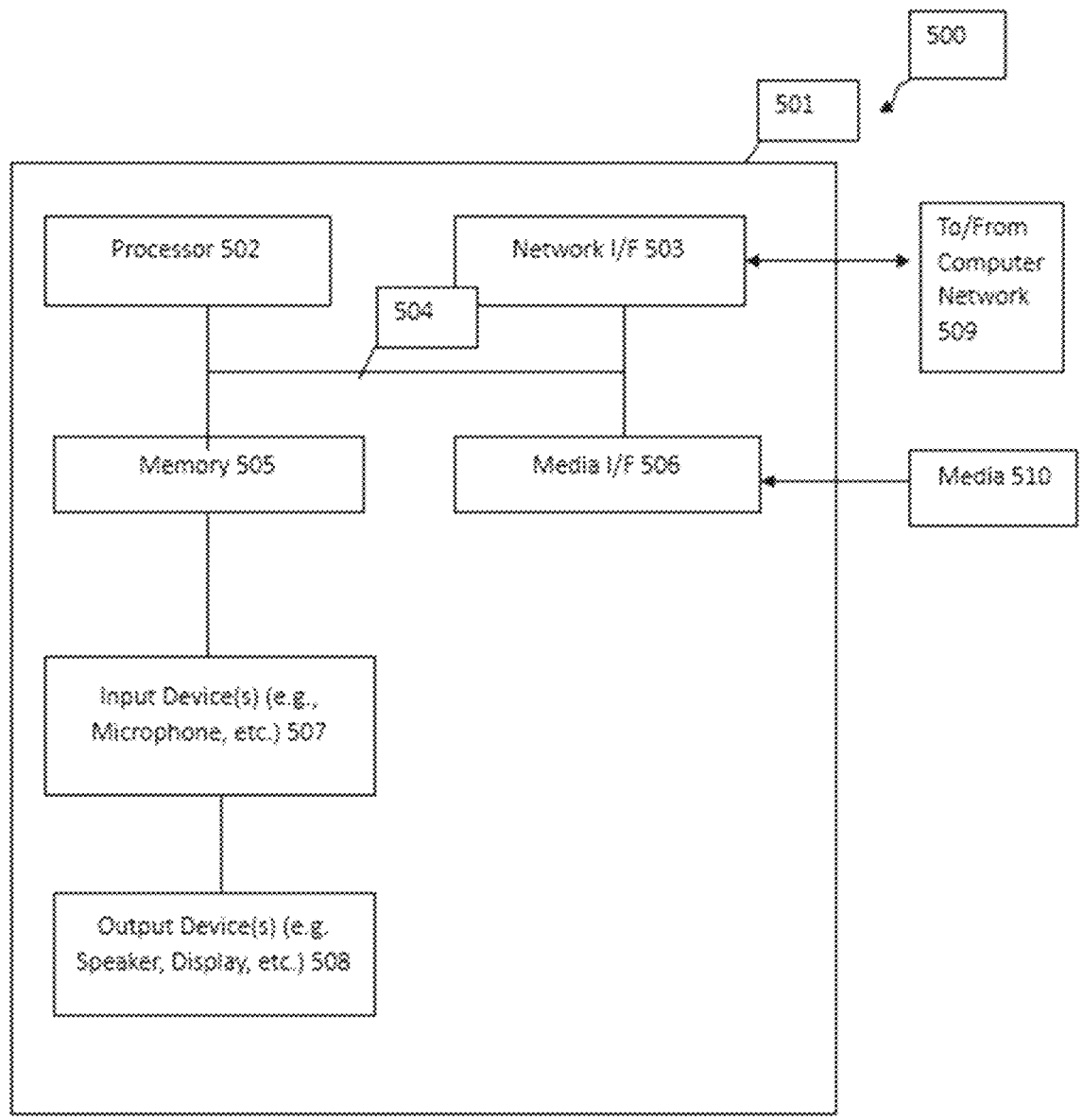
FIG. 5 is an example computer system that can implement the technology disclosed.
Figure 6:
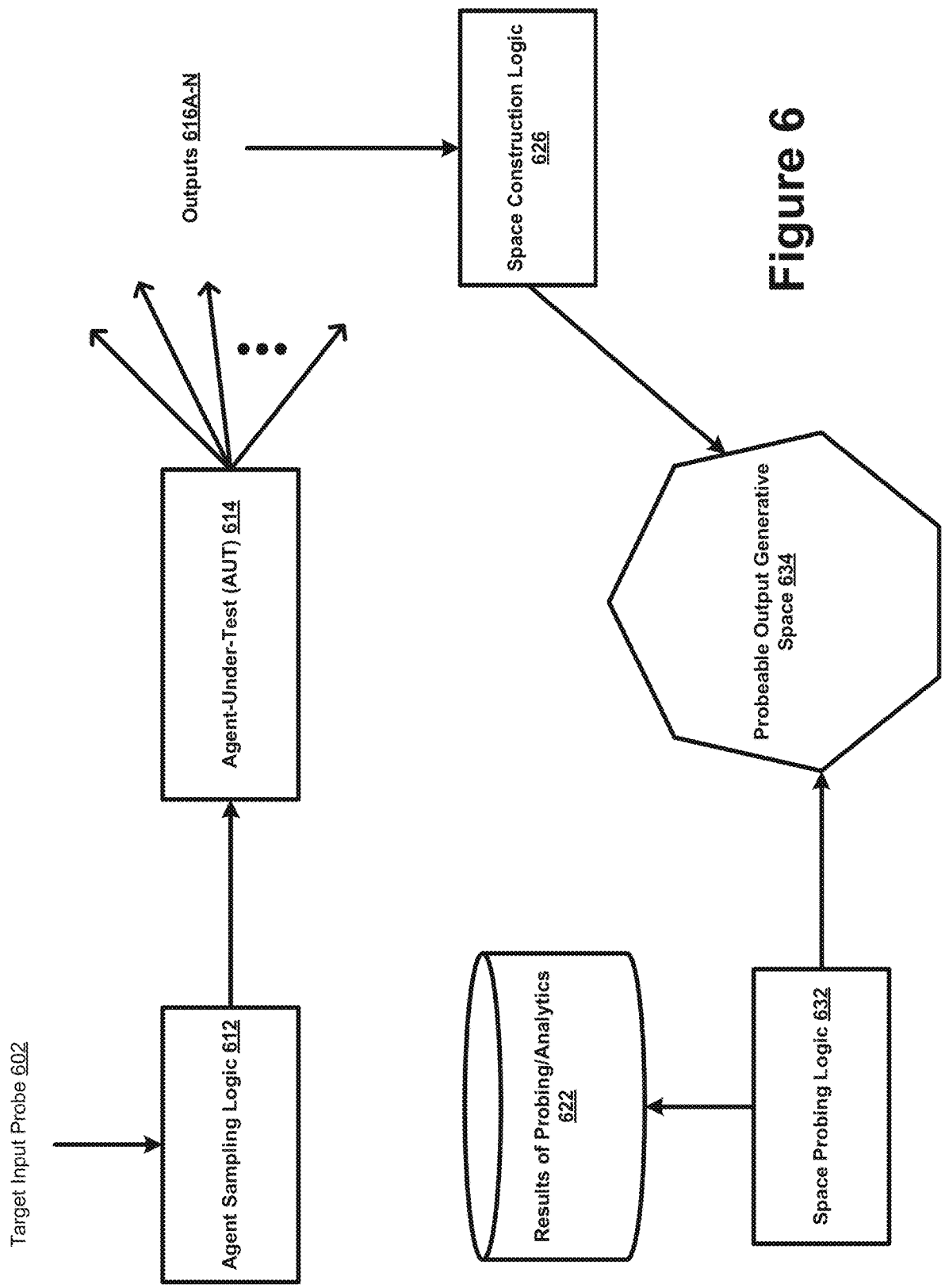
FIG. 6 is one implementation of the technology disclosed.

One or more implementations can make use of software running on a general-purpose computer or workstation. With reference to FIG. 5, such an implementation 500 employs, for example, a processor 502, a memory 505, and input devices 507 (e.g., microphone, keyboard, pointing device, etc.) and output devices 508 (e.g., audio speaker, display screen, etc.). The term "processor" as used herein is intended to include (but not be limited to) any processing device, such as, for example, one that includes a CPU (central processing unit) and/or other forms of processing circuitry. Further, the term "processor" may refer to more than one individual processor. The term "memory" is intended to include (but not be limited to) memory associated with a processor or CPU, such as, for example, RAM (random access memory), ROM (read-only memory), a fixed memory device (for example, hard drive), a removable memory device (for example, diskette), a flash memory and the like. In addition, the phrase "input/output devices" as used herein, is intended to include (but not be limited to) one or more mechanisms for inputting data to the processing unit and one or more mechanisms for providing results associated with the processing unit.

The processor 502, memory 505, and input/output devices 507/508 can be interconnected, for example, via bus 504 as part of a data processing unit 501. Suitable interconnections, for example, via bus 504, can also be provided to a network interface 503, such as a network card, which can be provided to interface with a computer network, and to a media interface 506, such as a diskette or CD-ROM drive, which can be provided to interface with media 510.

A data processing system suitable for storing and/or executing program code can include at least one processor 502 coupled directly or indirectly to memory elements 505 through a system bus 504. The memory elements can include local memory employed during actual execution of the program code, bulk storage, and cache memories which provide temporary storage of at least some program code in order to reduce the number of times code must be retrieved from bulk storage during execution.

Input/output (I/O) devices 507/508 can be coupled to the system either directly (such as via bus 504) or through intervening I/O controllers (omitted for clarity).

Network adapters such as network interface 503 may also be coupled to the system to enable the data processing system to become coupled to other data processing systems or remote printers or storage devices through intervening private or public networks. Modems, cable modems and Ethernet cards are just a few of the currently available types of network adapters.

As used herein, a server includes a physical data processing system (for example, system 501 as shown in FIG. 5) running a server program. It will be understood that such a physical server may or may not include a display and keyboard.

Accordingly, it is to be understood that the computer architecture 500 shown in FIG. 5 may represent one illustrative implementation of the apparatus. Also, the computer architecture 500 could represent an illustrative implementation of a client, e.g., a laptop, tablet, smartphone, or personal computer.

Although the foregoing description has been made with respect to preferred implementations of the technology disclosed it will be understood by those skilled in the art that many variations and alterations are possible. Some of these variations have been discussed above and others will be apparent to those skilled in the art.

Some implementations of the technology disclosed relate to using a Transformer model to provide an AI system. In particular, the technology disclosed proposes systems and methods for testing an AI Agent or a large language model (LLM), for example, based on the Transformer architecture. The Transformer model relies on a self-attention mechanism to compute a series of context-informed vector-space representations of elements in the input sequence and the output sequence, which are then used to predict distributions over subsequent elements as the model predicts the output sequence element-by-element. Not only is this mechanism straightforward to parallelize, but as each input's representation is also directly informed by all other inputs' representations, this results in an effectively global receptive field across the whole input sequence. This stands in contrast to, e.g., convolutional architectures which typically only have a limited receptive field.

In one implementation, the disclosed AI system is a multilayer perceptron (MLP). In another implementation, the disclosed AI system is a feedforward neural network. In yet another implementation, the disclosed AI system is a fully connected neural network. In a further implementation, the disclosed AI system is a fully convolution neural network. In a yet further implementation, the disclosed AI system is a semantic segmentation neural network. In a yet another further implementation, the disclosed AI system is a generative adversarial network (GAN) (e.g., CycleGAN, StyleGAN, pixelRNN, text-2-image, DiscoGAN, IsGAN). In a yet another implementation, the disclosed AI system includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, various ChatGPT versions, various LLAMA versions, BERT, Span-BERT, ROBERTa, XLNet, ELECTRA, UniLM, BART, T5, ERNIE (THU), KnowBERT, DeiT-Ti, DeiT-S, DeiT-B, T2T-ViT-15, T2T-VIT-110, T2T-VIT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S13/17, CMT-S, CMT-B, VOLO-D1, VOLO-D2, VOLO-D3, VOLO-D4, MoCo v3, ACT, TSP, Max-Deep-Lab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=17), SMCA, Efficient DETR, UP-DETR, UP-DETR, ViTB/17-FRCNN, VIT-B/17-FRCNN, PVT-Small+RetinaNet, Swin-T+Retina-Net, Swin-T+ATSS, PVT-Small+DETR, TNT-S+DETR, YOLOS-Ti, YOLOS-S, and YOLOS-B.

In one implementation, the disclosed AI system is a convolution neural network (CNN) with a plurality of convolution layers. In another implementation, the disclosed AI system is a recurrent neural network (RNN) such as a long short-term memory network (LSTM), bi-directional LSTM (Bi-LSTM), or a gated recurrent unit (GRU). In yet another implementation, the disclosed AI system includes both a CNN and an RNN.

In yet other implementations, the disclosed AI system can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The disclosed AI system can use one or more loss functions such as logistic regression/log loss, multi-class cross-entropy/softmax loss, binary cross-entropy loss, mean-squared error loss, L1 loss, L2 loss, smooth L1 loss, and Huber loss. The disclosed AI system can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The disclosed AI system can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The disclosed AI system can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality sensitive hashes, and inverted indexes). The disclosed AI system can be an ensemble of multiple models, in some implementations.

In some implementations, the disclosed AI system can be trained using backpropagation-based gradient update techniques. Example gradient descent techniques that can be used for training the disclosed AI system include stochastic gradient descent, batch gradient descent, and mini-batch gradient descent. Some examples of gradient descent optimization algorithms that can be used to train the disclosed AI system are Momentum, Nesterov accelerated gradient, Adagrad, Adadelta, RMSprop, Adam, AdaMax, Nadam, and AMSGrad.

Transformer Logic

Machine learning is the use and development of computer systems that can learn and adapt without following explicit instructions, by using algorithms and statistical models to analyze and draw inferences from patterns in data. Some of the state-of-the-art models use Transformers, a more powerful and faster model than neural networks alone. Transformers originate from the field of natural language processing (NLP), but can be used in computer vision and many other fields. Neural networks process input in series and weight relationships by distance in the series. Transformers can process input in parallel and do not necessarily weigh by distance. For example, in natural language processing, neural networks process a sentence from beginning to end with the weights of words close to each other being higher than those further apart. This leaves the end of the sentence very disconnected from the beginning causing an effect called the vanishing gradient problem. Transformers look at each word in parallel and determine weights for the relationships to each of the other words in the sentence. These relationships are called hidden states because they are later condensed for use into one vector called the context vector. Transformers can be used in addition to neural networks. This architecture is described here.

Encoder-Decoder Architecture

Figure 7:
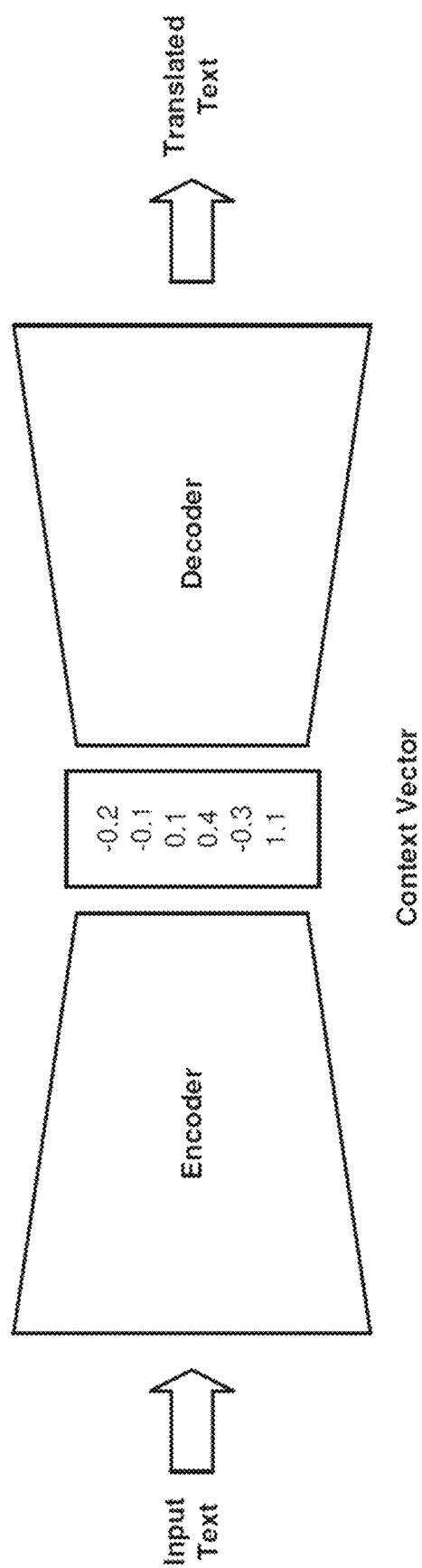
FIG. 7 is a schematic representation of an encoder-decoder architecture.
Figure 8:
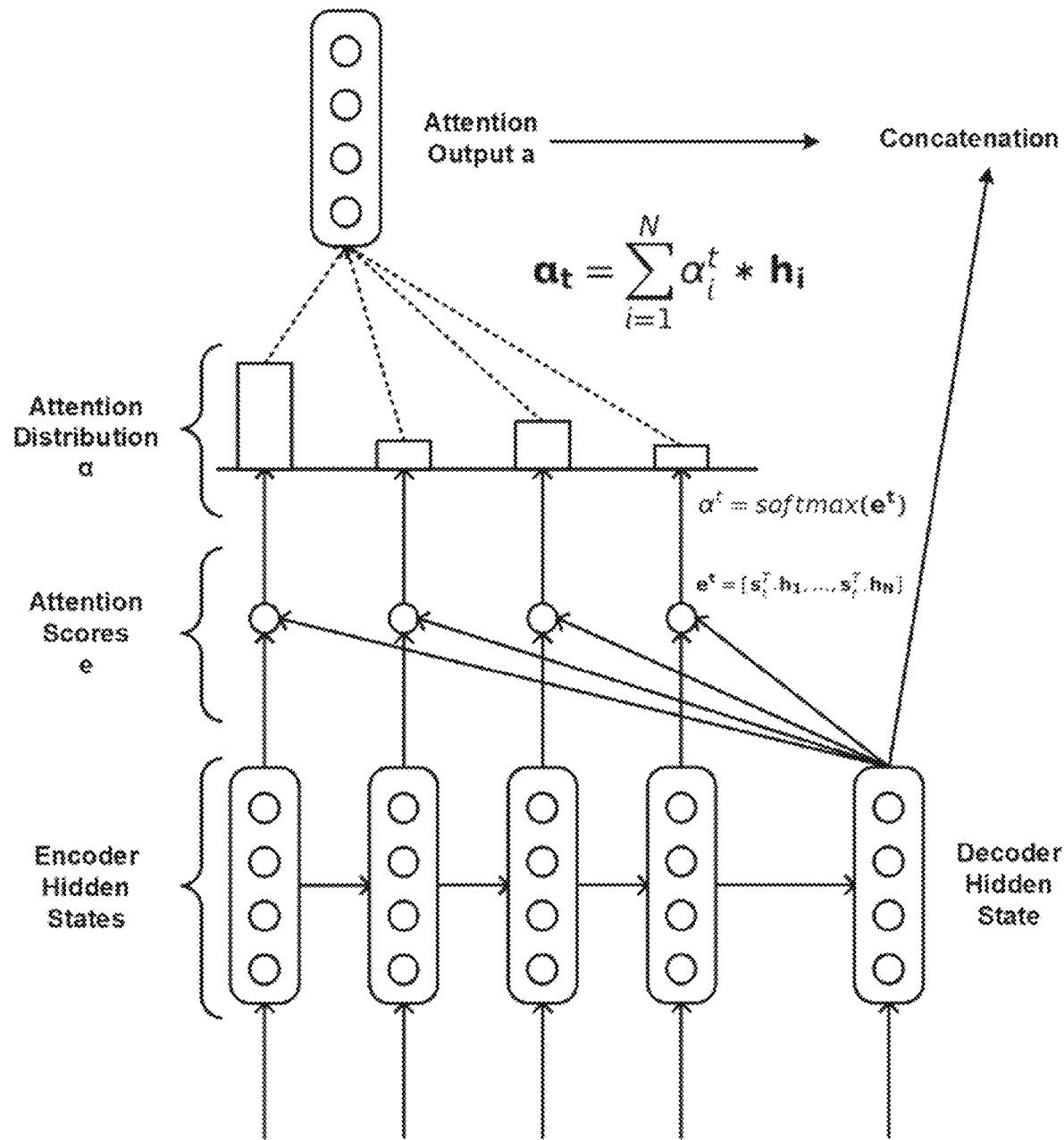
FIG. 8 shows an overview of an attention mechanism added onto an RNN encoder-decoder architecture.

FIG. 7 is a schematic representation of an encoder-decoder architecture. This architecture is often used for NLP and has two main building blocks. The first building block is the encoder that encodes an input into a fixed-size vector. In the system we describe here, the encoder is based on a recurrent neural network (RNN). At each time step, t, a hidden state of time step, t-1, is combined with the input value at time step t to compute the hidden state at timestep t. The hidden state at the last time step, encoded in a context vector, contains relationships encoded at all previous time steps. For NLP, each step corresponds to a word. Then the context vector contains information about the grammar and the sentence structure. The context vector can be considered a low-dimensional representation of the entire input space. For NLP, the input space is a sentence, and a training set consists of many sentences.

The context vector is then passed to the second building block, the decoder. For translation, the decoder has been trained on a second language. Conditioned on the input context vector, the decoder generates an output sequence. At each time step, t, the decoder is fed the hidden state of time step, t-1, and the output generated at time step, t-1. The first hidden state in the decoder is the context vector, generated by the encoder. The context vector is used by the decoder to perform the translation.

The whole model is optimized end-to-end by using backpropagation, a method of training a neural network in which the initial system output is compared to the desired output and the system is adjusted until the difference is minimized. In backpropagation, the encoder is trained to extract the right information from the input sequence, the decoder is trained to capture the grammar and vocabulary of the output language. This results in a fluent model that uses context and generalizes well. When training an encoder-decoder model, the real output sequence is used to train the model to prevent mistakes from stacking. When testing the model, the previously predicted output value is used to predict the next one.

When performing a translation task using the encoder-decoder architecture, all information about the input sequence is forced into one vector, the context vector. Information connecting the beginning of the sentence with the end is lost, the vanishing gradient problem. Also, different parts of the input sequence are important for different parts of the output sequence, information that cannot be learned using only RNNs in an encoder-decoder architecture.

Attention Mechanism

Attention mechanisms distinguish Transformers from other machine learning models. The attention mechanism provides a solution for the vanishing gradient problem. FIG. 7 shows an overview of an attention mechanism added onto an RNN encoder-decoder architecture. At every step, the decoder is given an attention score, e, for each encoder hidden state. In other words, the decoder is given weights for each relationship between words in a sentence. The decoder uses the attention score concatenated with the context vector during decoding. The output of the decoder at time step t is based on all encoder hidden states and the attention outputs. The attention output captures the relevant context for time step t from the original sentence. Thus, words at the end of a sentence may now have a strong relationship with words at the beginning of the sentence. In the sentence "The quick brown fox, upon arriving at the doghouse, jumped over the lazy dog," fox and dog can be closely related despite being far apart in this complex sentence.

To weight encoder hidden states, a dot product between the decoder hidden state of the current time step, and all encoder hidden states, is calculated. This results in an attention score for every encoder hidden state. The attention scores are higher for those encoder hidden states that are similar to the decoder hidden state of the current time step. Higher values for the dot product indicate the vectors are pointing more closely in the same direction. The attention scores are converted to fractions that sum to one using the SoftMax function.

The SoftMax scores provide an attention distribution. The x-axis of the distribution is position in a sentence. The y-axis is attention weight. The scores show which encoder hidden states are most closely related. The SoftMax scores specify which encoder hidden states are the most relevant for the decoder hidden state of the current time step.

The elements of the attention distribution are used as weights to calculate a weighted sum over the different encoder hidden states. The outcome of the weighted sum is called the attention output. The attention output is used to predict the output, often in combination (concatenation) with the decoder hidden states. Thus, both information about the inputs, as well as the already generated outputs, can be used to predict the next outputs.

By making it possible to focus on specific parts of the input in every decoder step, the attention mechanism solves the vanishing gradient problem. By using attention, information flows more directly to the decoder. It does not pass through many hidden states. Interpreting the attention step can give insights into the data. Attention can be thought of as a soft alignment. The words in the input sequence with a high attention score align with the current target word. Attention describes long-range dependencies better than RNN alone. This enables analysis of longer, more complex sentences.

The attention mechanism can be generalized as: given a set of vector values and a vector query, attention is a technique to compute a weighted sum of the vector values, dependent on the vector query. The vector values are the encoder hidden states, and the vector query is the decoder hidden state at the current time step.

The weighted sum can be considered a selective summary of the information present in the vector values. The vector query determines on which of the vector values to focus. Thus, a fixed-size representation of the vector values can be created, in dependence upon the vector query.

The attention scores can be calculated by the dot product, or by weighing the different values (multiplicative attention).

Embeddings

For most machine learning models, the input to the model needs to be numerical. The input to a translation model is a sentence, and words are not numerical. multiple methods exist for the conversion of words into numerical vectors. These numerical vectors are called the embeddings of the words. Embeddings can be used to convert any type of symbolic representation into a numerical one.

Embeddings can be created by using one-hot encoding. The one-hot vector representing the symbols has the same length as the total number of possible different symbols. Each position in the one-hot vector corresponds to a specific symbol. For example, when converting colors to a numerical vector, the length of the one-hot vector would be the total number of different colors present in the dataset. For each input, the location corresponding to the color of that value is one, whereas all the other locations are valued at zero. This works well for working with images. For NLP, this becomes problematic, because the number of words in a language is very large. This results in enormous models and the need for a lot of computational power. Furthermore, no specific information is captured with one-hot encoding. From the numerical representation, it is not clear that orange and red are more similar than orange and green. For this reason, other methods exist.

A second way of creating embeddings is by creating feature vectors. Every symbol has its specific vector representation, based on features. With colors, a vector of three elements could be used, where the elements represent the amount of yellow, red, and/or blue needed to create the color. Thus, all colors can be represented by only using a vector of three elements. Also, similar colors have similar representation vectors.

For NLP, embeddings based on context, as opposed to words, are small and can be trained. The reasoning behind this concept is that words with similar meanings occur in similar contexts. Different methods take the context of words into account. Some methods, like GloVe, base their context embedding on co-occurrence statistics from corpora (large texts) such as Wikipedia. Words with similar co-occurrence statistics have similar word embeddings. Other methods use neural networks to train the embeddings. For example, they train their embeddings to predict the word based on the context (Common Bag of Words), and/or to predict the context based on the word (Skip-Gram). Training these contextual embeddings is time intensive. For this reason, pre-trained libraries exist. Other deep learning methods can be used to create embeddings. For example, the latent space of a variational autoencoder (VAE) can be used as the embedding of the input. Another method is to use 1D convolutions to create embeddings. This causes a sparse, high-dimensional input space to be converted to a denser, low-dimensional feature space.

Self-Attention: Queries (Q), Keys (K), Values (V)

Transformer models are based on the principle of self-attention. Self-attention allows each element of the input sequence to look at all other elements in the input sequence and search for clues that can help it to create a more meaningful encoding. It is a way to look at which other sequence elements are relevant for the current element. The Transformer can grab context from both before and after the currently processed element.

When performing self-attention, three vectors need to be created for each element of the encoder input: the query vector (Q), the key vector (K), and the value vector (V). These vectors are created by performing matrix multiplications between the input embedding vectors using three unique weight matrices.

After this, self-attention scores are calculated. When calculating self-attention scores for a given element, the dot products between the query vector of this element and the key vectors of all other input elements are calculated. To make the model mathematically more stable, these self-attention scores are divided by the root of the size of the vectors. This has the effect of reducing the importance of the scalar thus emphasizing the importance of the direction of the vector. Just as before, these scores are normalized with a SoftMax layer. This attention distribution is then used to calculate a weighted sum of the value vectors, resulting in a vector z for every input element. In the attention principle explained above, the vector to calculate attention scores and to perform the weighted sum was the same, in self-attention two different vectors are created and used. As the self-attention needs to be calculated for all elements (thus a query for every element), one formula can be created to calculate a Z matrix. The rows of this Z matrix are the z vectors for every sequence input element, giving the matrix a size length sequence dimension QKV.

Figure 9:
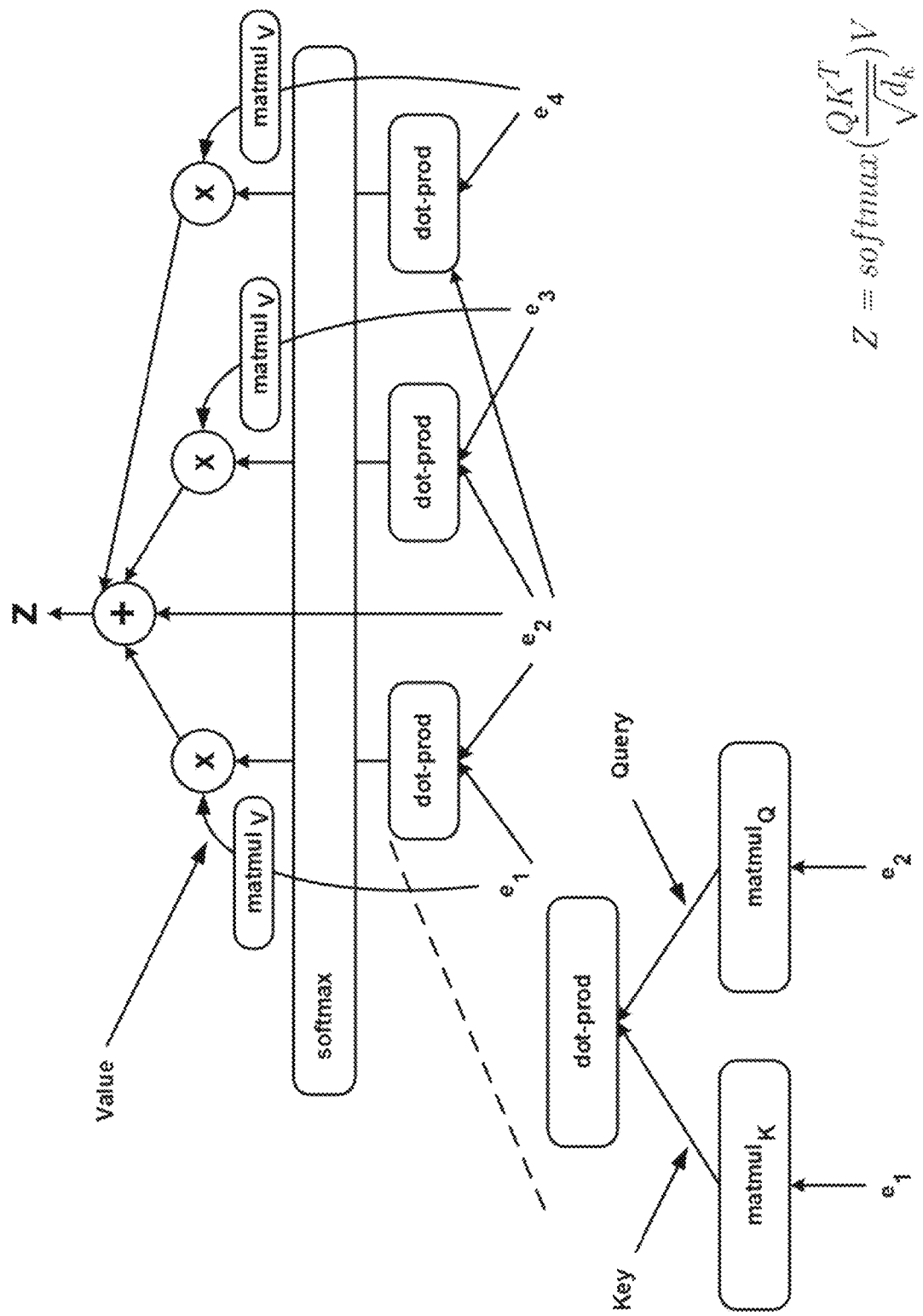
FIG. 9 is a schematic representation of the calculation of self-attention showing one attention head.

Multi-headed attention is executed in the Transformer. FIG. 9 is a schematic representation of the calculation of self-attention showing one attention head. For every attention head, different weight matrices are trained to calculate Q, K, and V. Every attention head outputs a matrix Z. Different attention heads can capture different types of information. The different Z matrices of the different attention heads are concatenated. This matrix can become large when multiple attention heads are used. To reduce dimensionality, an extra weight matrix W is trained to condense the different attention heads into a matrix with the same size as one Z matrix. This way, the amount of data given to the next step does not enlarge every time self-attention is performed.

When performing self-attention, information about the order of the different elements within the sequence is lost. To address this problem, positional encodings are added to the embedding vectors. Every position has its unique positional encoding vector. These vectors follow a specific pattern, which the Transformer model can learn to recognize. This way, the model can consider distances between the different elements.

As discussed above, in the core of self-attention are three objects: queries (Q), keys (K), and values (V). Each of these objects has an inner semantic meaning of their purpose. One can think of these as analogous to databases. We have a user-defined query of what the user wants to know. Then we have the relations in the database, i.e., the values which are the weights. More advanced database management systems create some apt representation of its relations to retrieve values more efficiently from the relations. This can be achieved by using indexes, which represent information about what is stored in the database. In the context of attention, indexes can be thought of as keys. So instead of running the query against values directly, the query is first executed on the indexes to retrieve where the relevant values or weights are stored. Lastly, these weights are run against the original values to retrieve data that is most relevant to the initial query.

Figure 10:
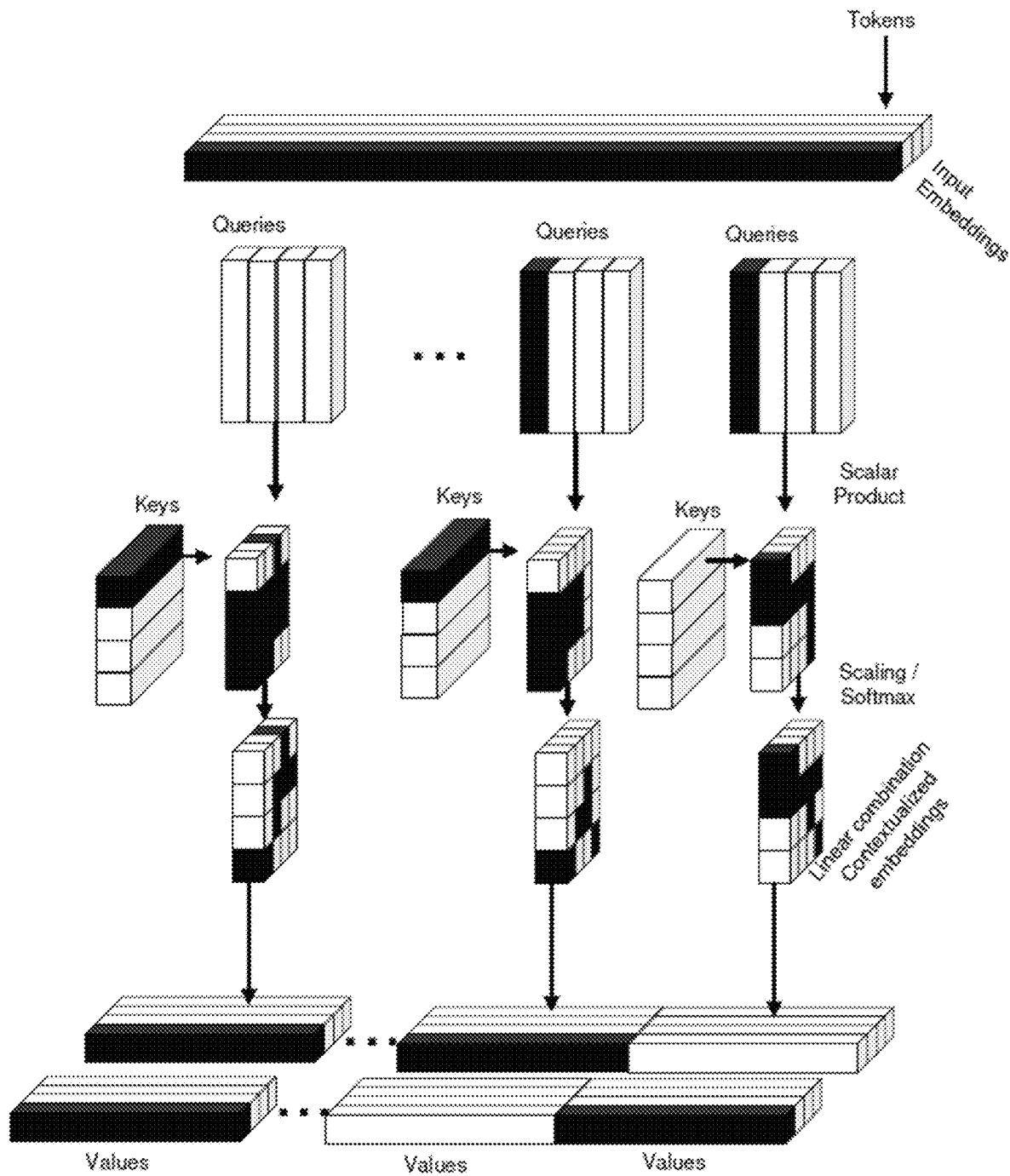
FIG. 10 is a depiction of several attention heads in a Transformer block.

FIG. 10 depicts several attention heads in a Transformer block. We can see that the outputs of queries and keys dot products in different attention heads are differently colored. This depicts the capability of the multi-head attention to focus on different aspects of the input and aggregate the obtained information by multiplying the input with different attention weights.

Examples of attention calculation include scaled dot-product attention and additive attention. There are several reasons why scaled dot-product attention is used in the Transformers. Firstly, the scaled dot-product attention is relatively fast to compute, since its main parts are matrix operations that can be run on modern hardware accelerators. Secondly, it performs similarly well for smaller dimensions of the K matrix, dk, as the additive attention. For larger dk, the scaled dot-product attention performs a bit worse because dot products can cause the vanishing gradient problem. This is compensated via the scaling factor, which is defined as $\sqrt{dk}$.

As discussed above, the attention function takes as input three objects: key, value, and query. In the context of Transformers, these objects are matrices of shapes (n, d), where n is the number of elements in the input sequence and d is the hidden representation of each element (also called the hidden vector). Attention is then computed as:

$$\text{Attention}(Q, K, V) = \text{SoftMax}\left(\frac{QK^T}{\sqrt{dk}}\right)V$$

where Q, K, V are computed as:

$$X \cdot W_Q, X \cdot W_K, X \cdot W_V$$

X is the input matrix and $W_Q$, $W_K$, $W_V$ are learned weights to project the input matrix into the representations. The dot products appearing in the attention function are exploited for their geometrical interpretation where higher values of their results mean that the inputs are more similar, i.e., pointing in the geometrical space in the same direction. Since the attention function now works with matrices, the dot product becomes matrix multiplication. The SoftMax function is used to normalize the attention weights into the value of 1 prior to being multiplied by the values matrix. The resulting matrix is used either as input into another layer of attention or becomes the output of the Transformer.

Multi-Head Attention

Transformers become even more powerful when multi-head attention is used. Queries, keys, and values are computed the same way as above, though they are now projected into h different representations of smaller dimensions using a set of h learned weights. Each representation is passed into a different scaled dot-product attention block called a head. The head then computes its output using the same procedure as described above.

Formally, the multi-head attention is defined as:

$$\text{MultiHeadAttention}(Q,K,V) = [\text{head}_1, \ldots, \text{head}_h]W_0$$
$$\text{where head}_i = \text{Attention}(QW_i^Q, KW_i^K, VW_i^V)$$

The outputs of all heads are concatenated together and projected again using the learned weights matrix $W_0$ to match the dimensions expected by the next block of heads or the output of the Transformer. Using the multi-head attention instead of the simpler scaled dot-product attention enables Transformers to jointly attend to information from different representation subspaces at different positions.

Figure 11:
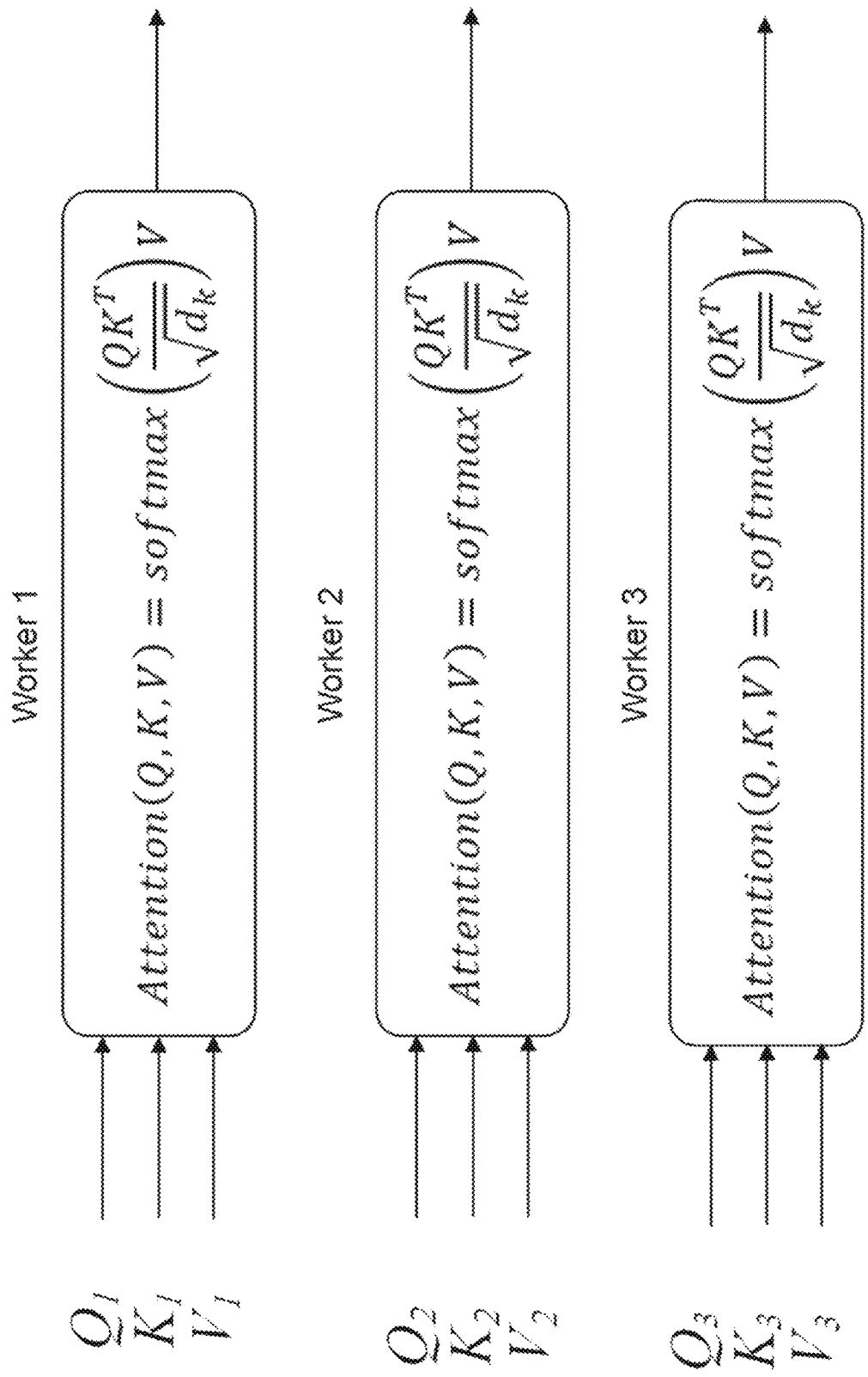
FIG. 11 is an illustration that shows how one can use multiple workers to compute the multi-head attention in parallel, as the respective heads compute their outputs independently of one another.

As shown in FIG. 11, one can use multiple workers to compute the multi-head attention in parallel, as the respective heads compute their outputs independently of one another. Parallel processing is one of the advantages of Transformers over RNNs.

Assuming the naive matrix multiplication algorithm which has a complexity of:

$$a \cdot b \cdot c$$

For matrices of shape (a, b) and (c, d), to obtain values Q, K, V', we need to compute the operations:

$$X \cdot W_Q, X \cdot W_K, X \cdot WV$$

The matrix X is of shape (n, d) where n is the number of patches and d is the hidden vector dimension. The weights $W_Q$, $W_K$, $W_V$ are all of shape (d, d). Omitting the constant factor 3, the resulting complexity is:

$$n \cdot d^2$$

We can proceed to the estimation of the complexity of the attention function itself, i.e., of $$\text{SoftMax}\left(\frac{QK^T}{\sqrt{dk}}\right)V.$$

The matrices Q and K are both of shape (n, d). The transposition operation does not influence the asymptotic complexity of computing the dot product of matrices of shapes (n, d)·(d, n), therefore its complexity is:

$$n^2 \cdot d$$

Scaling by a constant factor of $\sqrt{dk}$, where dk is the dimension of the keys vector, as well as applying the SoftMax function, both have the complexity of a·b for a matrix of shape (a, b), hence they do not influence the asymptotic complexity. Lastly the dot product.

$$\text{SoftMax}\left(\frac{QK^T}{\sqrt{dk}}\right).$$

V is between matrices of shapes (n, n) and (n, d) and so its complexity is:

$$n^2 \cdot d$$

The final asymptotic complexity of scaled dot-product attention is obtained by summing the complexities of computing Q, K, V, and of the following attention function:

$$n \cdot d^2 + n^2 \cdot d.$$

The asymptotic complexity of multi-head attention is the same since the original input matrix X is projected into h matrices of shapes $$\left(n, \frac{d}{h}\right),$$

where h is the number of heads. From the point of view of asymptotic complexity, h is constant, therefore we would arrive at the same estimate of asymptotic complexity using a similar approach as for the scaled dot-product attention.

Transformer models often have the encoder-decoder architecture, although this is not necessarily the case. The encoder is built out of different encoder layers which are all constructed in the same way. The positional encodings are added to the embedding vectors. Afterward, self-attention is performed.

Encoder Block of Transformer

Figure 12:
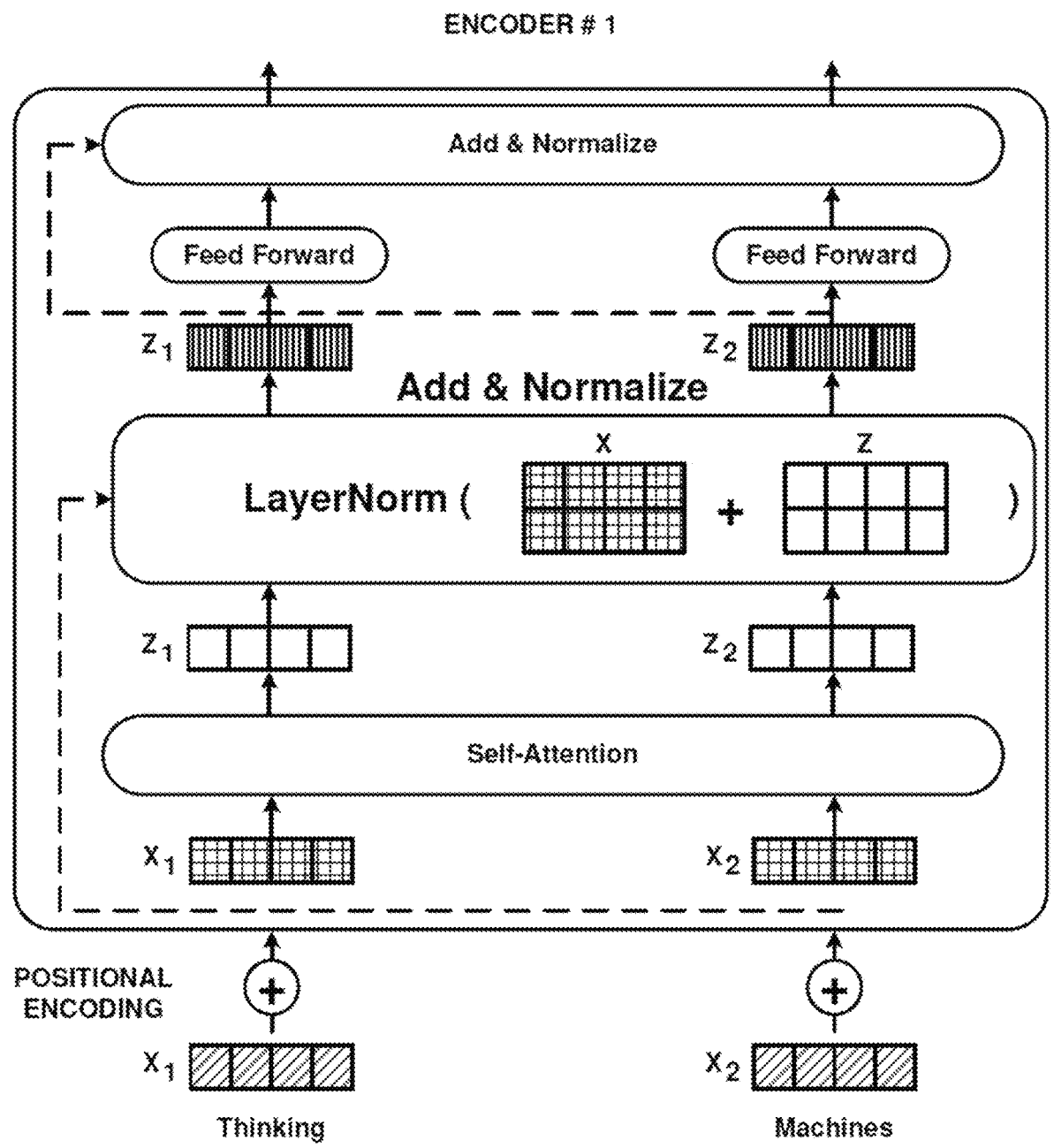
FIG. 12 is a portrayal of one encoder layer of a Transformer network.

FIG. 12 portrays one encoder layer of a Transformer network. Every self-attention layer is surrounded by a residual connection, summing up the output and input of the self-attention. This sum is normalized, and the normalized vectors are fed to a feed-forward layer. Every z vector is fed separately to this feed-forward layer. The feed-forward layer is wrapped in a residual connection and the outcome is normalized too. Often, numerous encoder layers are piled to form the encoder. The output of the encoder is a fixed-size vector for every element of the input sequence.

Just like the encoder, the decoder is built from different decoder layers. In the decoder, a modified version of self-attention takes place. The query vector is only compared to the keys of previous output sequence elements. The elements further in the sequence are not known yet, as they still must be predicted. No information about these output elements may be used.

Encoder-Decoder Blocks of Transformer

Figure 13:
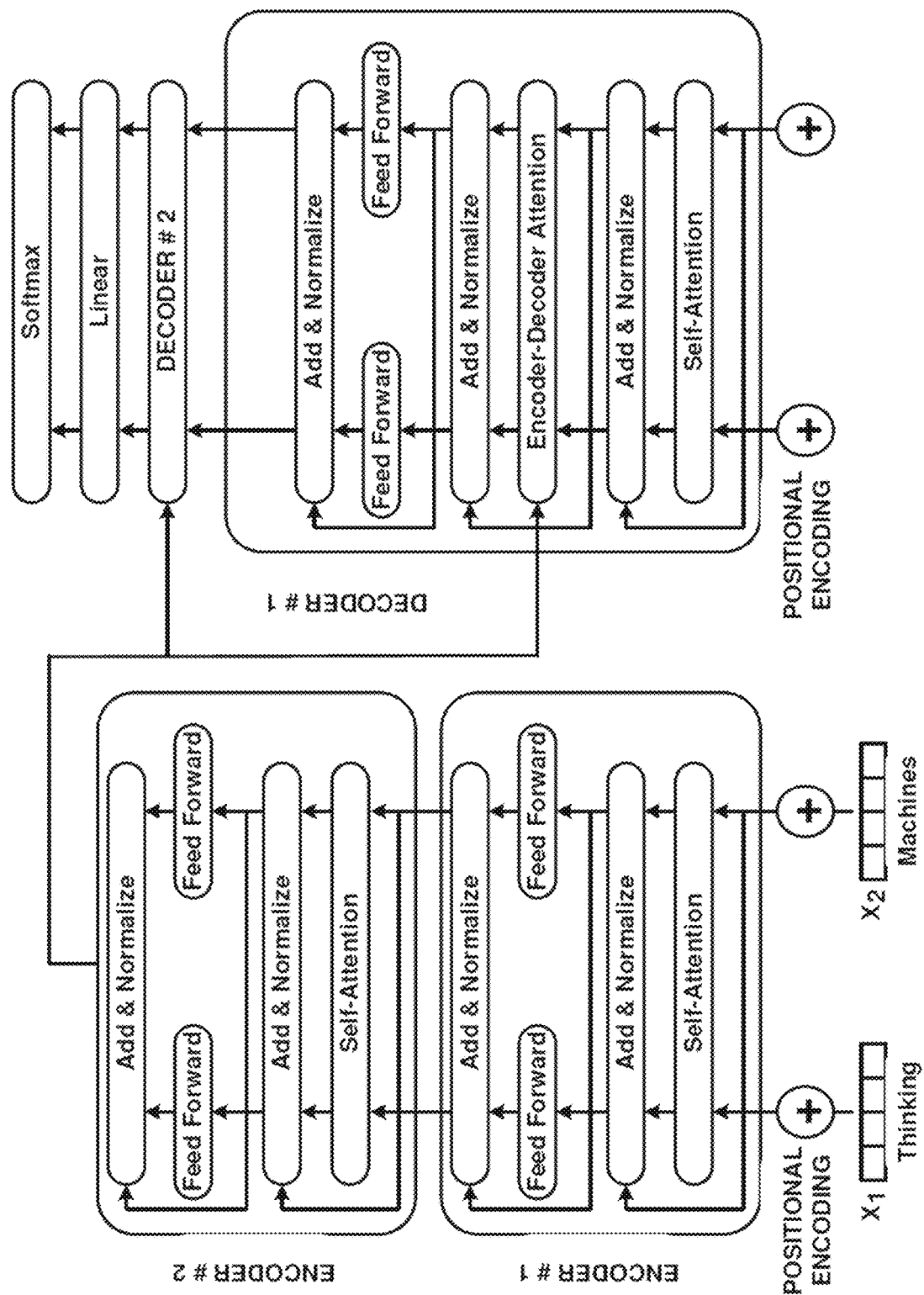
FIG. 13 shows a schematic overview of a Transformer model.

FIG. 13 shows a schematic overview of a Transformer model. Next to a self-attention layer, a layer of encoder-decoder attention is present in the decoder, in which the decoder can examine the last Z vectors of the encoder, providing fluent information transmission. The ultimate decoder layer is a feed-forward layer. All layers are packed in a residual connection. This allows the decoder to examine all previously predicted outputs and all encoded input vectors to predict the next output. Thus, information from the encoder is provided to the decoder, which could improve the predictive capacity. The output vectors of the last decoder layer need to be processed to form the output of the entire system. This is done by a combination of a feed-forward layer and a SoftMax function. The output corresponding to the highest probability is the predicted output value for a subject time step.

For some tasks other than translation, only an encoder is needed. This is true for both document classification and name entity recognition. In these cases, the encoded input vectors are the input of the feed-forward layer and the SoftMax layer. Transformer models have been extensively applied in different NLP fields, such as translation, document summarization, speech recognition, and named entity recognition. These models have applications in the field of biology as well for predicting protein structure and function and labeling DNA sequences.

Vision Transformer

There are extensive applications of transformers in vision including popular recognition tasks (e.g., image classification, object detection, action recognition, and segmentation), generative modeling, multi-modal tasks (e.g., visual-question answering, visual reasoning, and visual grounding), video processing (e.g., activity recognition, video forecasting), low-level vision (e.g., image super-resolution, image enhancement, and colorization) and 3D analysis (e.g., point cloud classification and segmentation).

Transformers were originally developed for NLP and worked with sequences of words. In image classification, we often have a single input image in which the pixels are in a sequence. To reduce the computation required, Vision Transformers (ViTs) cut the input image into a set of fixed-sized patches of pixels. The patches are often 17×17 pixels. They are treated much like words in NLP Transformers. ViTs are depicted in FIGS. 14A, 14B, 15A, 15B, 15C, and 15D. Unfortunately, important positional information is lost because image sets are position-invariant. This problem is solved by adding a learned positional encoding into the image patches.

Figure 14B:
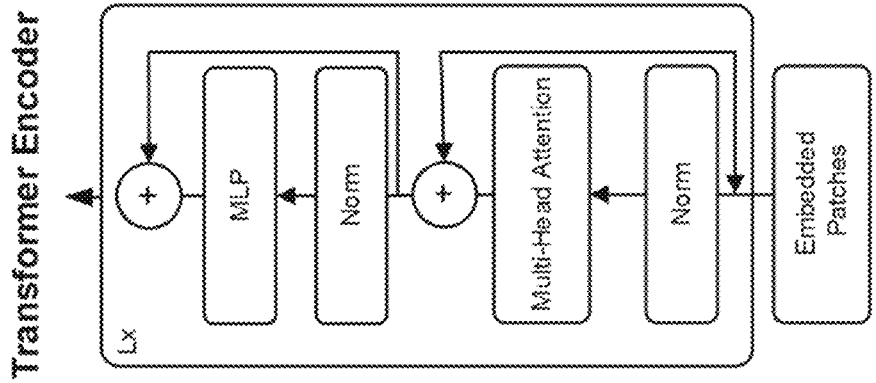
FIGS. 14A-14B are a depiction of a Vision Transformer (ViT).
Figure 14A:
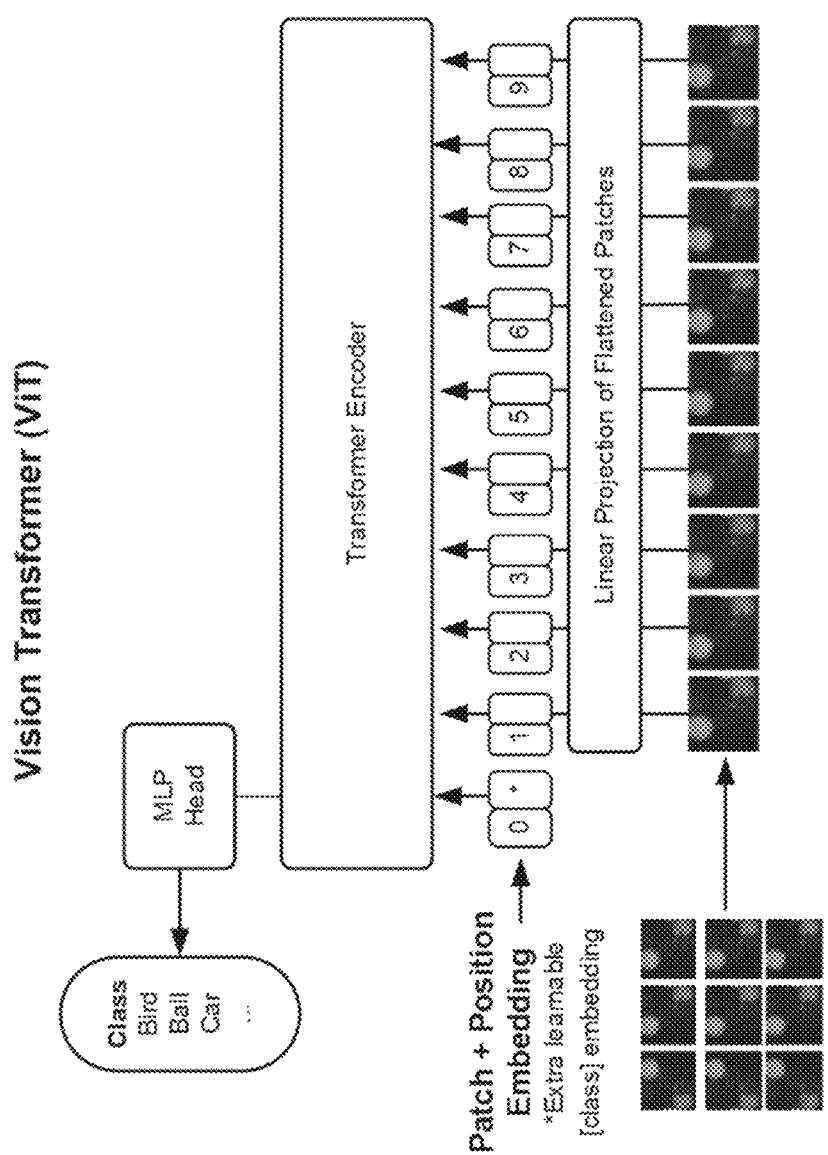
Figures 15A, 15B, 15C, 15D:
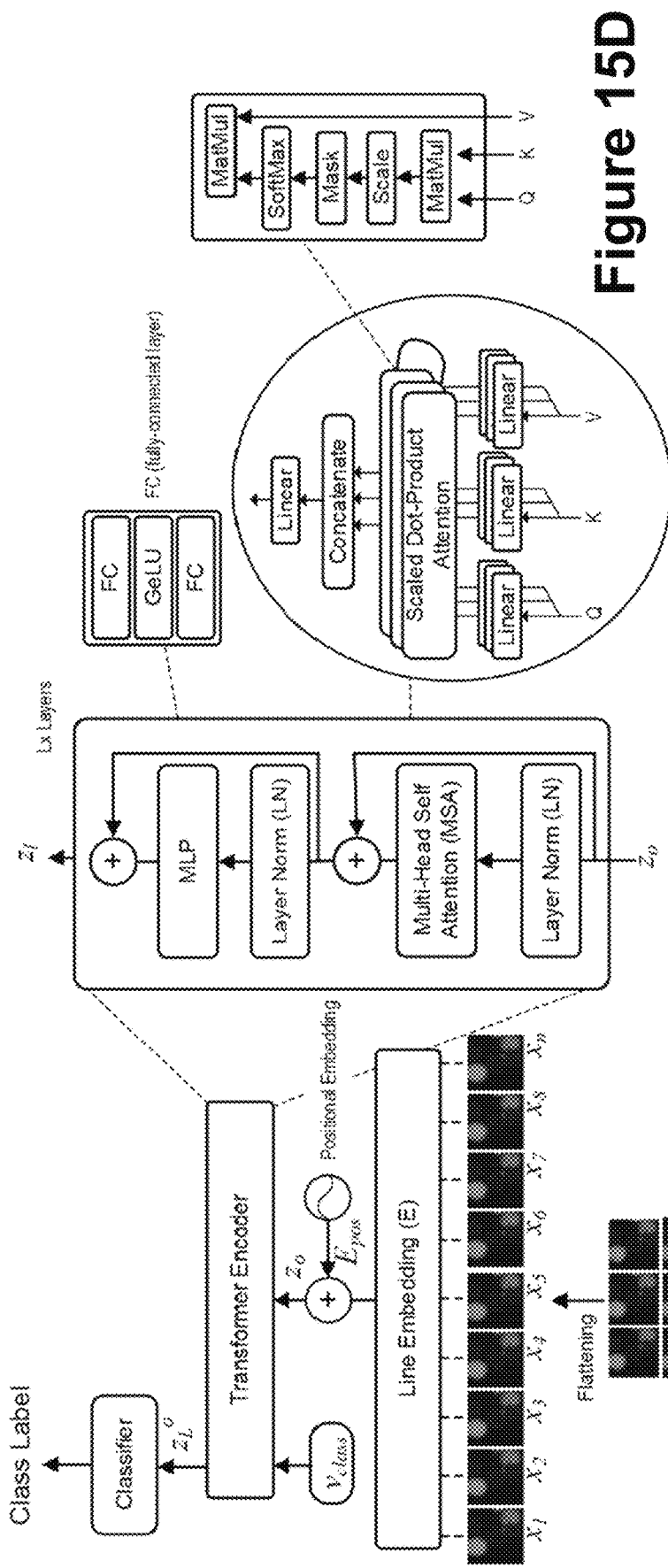
FIGS. 15A-15D illustrate a processing flow of the Vision Transformer (ViT).

The computations of the ViT architecture can be summarized as follows. The first layer of a ViT extracts a fixed number of patches from an input image (FIG. 14A). The patches are then projected to linear embeddings. A special class token vector is added to the sequence of embedding vectors to include all representative information of all tokens through the multi-layer encoding procedure. The class vector is unique to each image. Vectors containing positional information are combined with the embeddings and the class token. The sequence of embedding vectors is passed into the Transformer blocks. The class token vector is extracted from the output of the last Transformer block and is passed into a multilayer perceptron (MLP) head whose output is the final classification. The perceptron takes the normalized input and places the output in categories. It classifies the images. This procedure directly translates into the Python Keras code shown in FIG. 16.

When the input image is split into patches, a fixed patch size is specified before instantiating a ViT. Given the quadratic complexity of attention, patch size has a large effect on the length of training and inference time. A single Transformer block comprises several layers. The first layer implements Layer Normalization, followed by the multi-head attention that is responsible for the performance of ViTs. In the depiction of a Transformer block in FIG. 14B, we can see two arrows. These are residual skip connections. Including skip connection data can simplify the output and improve the results. The output of the multi-head attention is followed again by Layer Normalization. And finally, the output layer is an MLP (Multi-Layer Perceptron) with the GELU (Gaussian Error Linear Unit) activation function.

ViTs can be pretrained and fine-tuned. Pretraining is generally done on a large dataset. Fine-tuning is done on a domain specific dataset.

Domain-specific architectures, like convolutional neural networks (CNNs) or long short-term memory networks (LSTMs), have been derived from the usual architecture of MLPs and suffer from so-called inductive biases that predispose the networks towards a certain output. ViTs stepped in the opposite direction of CNNs and LSTMs and became more general architectures by eliminating inductive biases. A ViT can be seen as a generalization of MLPs because MLPs, after being trained, do not change their weights for different inputs. On the other hand, ViTs compute their attention weights at runtime based on the particular input.

The following detailed description is made with reference to the figures. Example implementations are described to illustrate the technology disclosed, not to limit its scope, which is defined by the claims. Those of ordinary skill in the art will recognize a variety of equivalent variations on the description that follows. Reference will now be made in detail to the exemplary implementations of the present disclosure, examples of which are illustrated in the accompanying drawings. Wherever possible, the same reference numbers will be used throughout the drawings to refer to the same or like parts.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general-purpose signal processor or a block of random-access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Computer System

Figure 17:
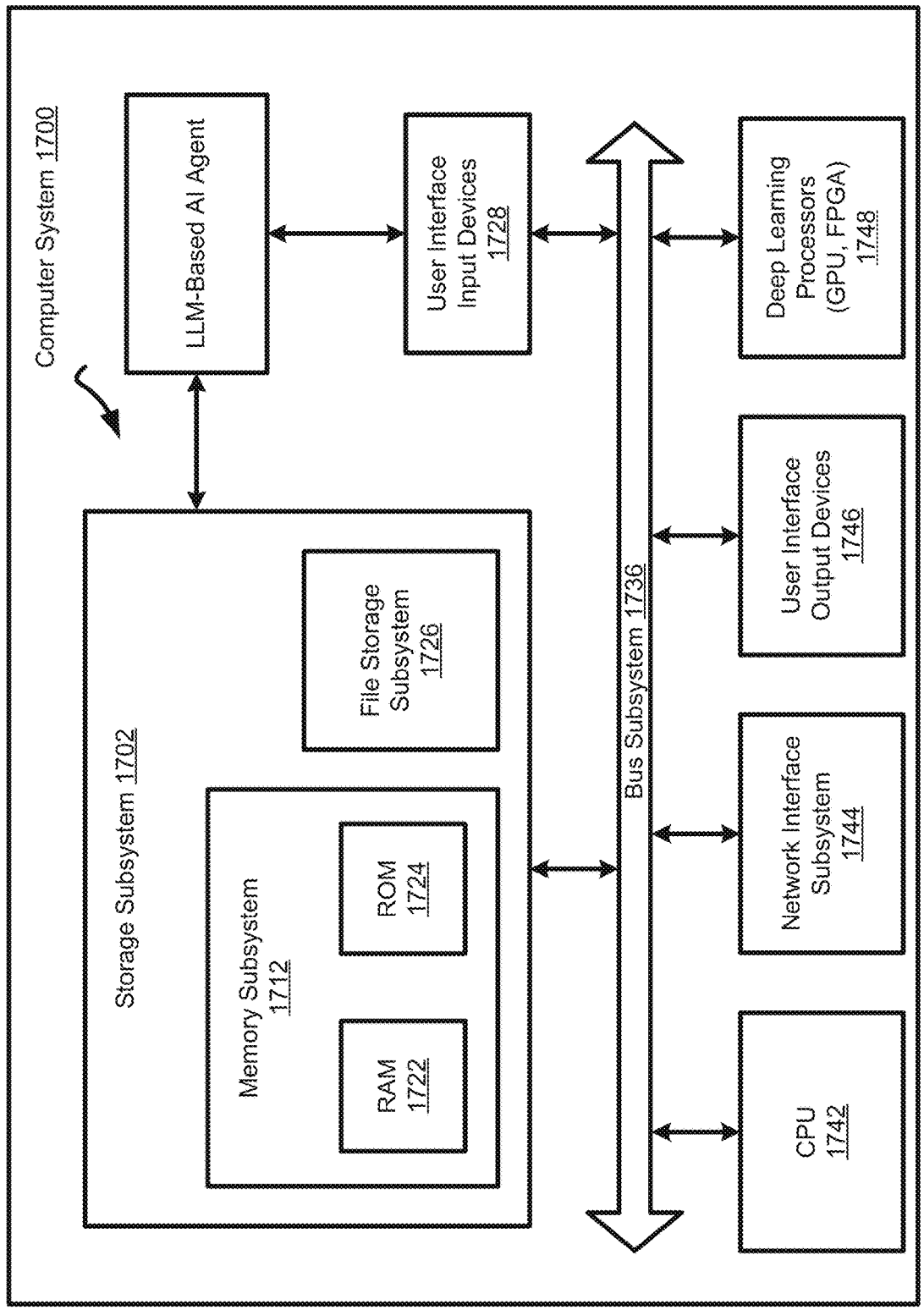
FIG. 17 illustrates an example configuration of a computing device that can be used to implement the systems and techniques described herein.

FIG. 17 shows an example computer system 1700 that can be used to implement the technology disclosed. Computer system 1700 includes at least one central processing unit (CPU) 1742 that communicates with a number of peripheral devices via bus subsystem 1726. These peripheral devices can include a storage subsystem 1702 including, for example, memory devices and a file storage subsystem 1726, user interface input devices 1728, user interface output devices 1746, and a network interface subsystem 1744. The input and output devices allow user interaction with computer system 1700. Network interface subsystem 1744 provides an interface to outside networks, including an interface to corresponding interface devices in other computer systems.

In one implementation, an LLM-based AI agent is communicably linked to the storage subsystem 1702 and the user interface input devices 1728.

User interface input devices 1728 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1700.

User interface output devices 1746 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1700 to the user or to another machine or computer system.

Storage subsystem 1702 stores programming and data constructs that provide the functionality of some or all of the modules and methods described herein. These software modules are generally executed by processors 1748.

Processors 1748 can be graphics processing units (GPUs), field-programmable gate arrays (FPGAs), application-specific integrated circuits (ASICs), and/or coarse-grained reconfigurable architectures (CGRAs). Processors 1748 can be hosted by a deep learning cloud platform such as Google Cloud Platform™, Xilinx™, and Cirrascale™. Examples of processors 1748 include Google's Tensor Processing Unit (TPU)™, rackmount solutions like GX4 Rackmount Series™, GX17 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V110s™, and others.

Memory subsystem 1712 used in the storage subsystem 1702 can include a number of memories including a main random access memory (RAM) 1722 for storage of instructions and data during program execution and a read only memory (ROM) 1724 in which fixed instructions are stored. A file storage subsystem 1726 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1726 in the storage subsystem 1702, or in other machines accessible by the processor.

Bus subsystem 1736 provides a mechanism for letting the various components and subsystems of computer system 1700 communicate with each other as intended. Although bus subsystem 1736 is shown schematically as a single bus, alternative implementations of the bus subsystem can use multiple busses.

Computer system 1700 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1700 depicted in FIG. 17 is intended only as a specific example for purposes of illustrating the preferred implementations of the present technology disclosed. Many other configurations of computer system 1700 are possible having more or less components than the computer system depicted in FIG. 17.

In various implementations, a learning system is provided. In some implementations, a feature vector is provided to a learning system. Based on the input features, the learning system generates one or more outputs. In some implementations, the output of the learning system is a feature vector. In some implementations, the learning system comprises an SVM. In other implementations, the learning system comprises an artificial neural network. In some implementations, the learning system is pre-trained using training data. In some implementations training data is retrospective data. In some implementations, the retrospective data is stored in a data store. In some implementations, the learning system may be additionally trained through manual curation of previously generated outputs.

In some implementations, an object detection pipeline is a trained classifier. In some implementations, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

FIG. 17 is a schematic of an exemplary computing node. Computing node 1700 is only one example of a suitable computing node and is not intended to suggest any limitation as to the scope of use or functionality of embodiments described herein. Regardless, computing node 1700 is capable of being implemented and/or performing any of the functionality set forth hereinabove.

In computing node 1700 there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed computing environments where tasks are performed by remote processing devices that are linked through a communications network. In a distributed computing environment, program modules may be located in both local and remote computer system storage media including memory storage devices.

As shown in FIG. 17, computer system/server in computing node 1700 is shown in the form of a general-purpose computing device. The components of computer system/server may include, but are not limited to, one or more processors or processing units, a system memory, and a bus that couples various system components including system memory to processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server typically includes a variety of computer system readable media. Such media may be any available media that is accessible by computer system/server, and it includes both volatile and non-volatile media, removable and non-removable media.

System memory can include computer system readable media in the form of volatile memory, such as random access memory (RAM) and/or cache memory. Algorithm Computer system/server may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, memory may include at least one program product having a set (e.g., at least one) of program modules that are configured to carry out the functions of embodiments of the disclosure.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments as described herein.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

CLAUSES

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed, or elements thereof can be implemented in the form of a computer product, including a non-transitory computer readable storage medium with computer usable program code for performing the method steps indicated. Furthermore, one or more implementations and clauses of the technology disclosed, or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We Disclose the Following Clauses:

Clause Set 1

1. A computer-implemented method of auditing a non-deterministic artificial intelligence (A.I.) comprising: receiving one or more concepts, one or more of which may be in the form of a prompt; a language module ("LM") generating from the concept one or more variations of the prompt; receiving one or more keywords; an testing module sequentially prompting an A.I. with one received prompt at a time; receiving a reply ("output") from the A.I; iteratively querying the AI model with the same prompt; stopping the sampling process when the convergence of topic probabilities is within a specified tolerance level.
2. The method of clause 1, wherein the predefined tolerance level is set by a user.
3. The method of clause 1, wherein the level of fuzzy logic for the relation of keywords to topics is set by the user.
4. The method of clause 1, leveraging a Bayesian hierarchical model to determine distributions across prompt variations.
5. The method of clause 1, wherein a set a priori is set for share of voice percentage as a uniformed prior for topics based on past searches or a set default percentage; and a share of voice percentage testing module determines share of voice percentage, defined as the percent of the time that each topic appears in the total output for a given prompt and the percent of the time that each keyword appears in the outputs for all prompts; it stores the information; it repeats the process for each interval.
6. The method if clause 1, wherein a set a priori is set for share of voice percentile as a uniformed prior for topics based on past searches or a set default percentile; and a share of voice percentile testing module calculates the number of words until each keyword first appears in the output of the A.I. divided by the total words in the output for a given prompt and the number of words until each keyword first appears in the output of the A.I. divided by the total words in the output for all prompts; it stores the information; it repeats the process for each interval.
7. The method of clause 1, wherein a set a priori is set for share of voice proportions as a uniformed prior for topics based on past searches or a set default percentile; wherein a share of voice topic proportion testing module calculates the proportion for each topic by determining the proportion of time the topic appears in the outputs relative to the total occurrences of all topics for the outputs for a prompt and/or calculates the proportion of time the topic appears in the outputs relative to the total occurrences of all topics for the outputs of all prompts; it outputs an information based on the proportion of specific keywords. it stores the information; it repeats the process for each interval.
8. The method of claim 1, wherein a new topics testing module iteratively determines categories ("topics") from the output, incorporating the received and generated keywords; continuously updating a distribution of the topics identified from the sampled outputs, wherein the updating process includes iteratively refining the distribution by considering the variation and frequency of topics observed in successive samples; determining the accuracy of the identified topics and the completeness with respect to the topic; adaptively updating the likelihood of topic appearing with each iteration based on previous iterations to create a posterior probability; ceasing sampling when the rate significantly diminishes.
9. The method of clause 1, wherein generator, integrated in the Generative Adversarial Network (GAN) module, learns to mimic the distribution of topics in these outputs, while a discriminator, integrated in the GAN module, learns to spot whether the output is real or generated; as the GAN module improves by training on more outputs, it creates synthetic data that looks just like the actual A.I. outputs, with the same mix of topics; and the GAN module may determine when to stop sampling the output from the A.I. to be tested for topics based on the performance of the GAN. If the data from the generator so similar to the authentic data that the discriminator cannot discriminate real from fake, the GAN has learned the distribution of topics well and the apparatus may stop sampling the output for topics; the GAN module may also use a loss function to measure the generators performance.
10. The method of clause 1, wherein a predictive testing module evaluates the accuracy of topic predictions based on the current distribution of topics and stops when further samples do not significantly enhance predictive accuracy.
11. The method of clause 1, wherein receiving the concept further comprises receiving from a user one or more keywords, generating a list of suggestions by a suggestion A.I.; receiving a selection from the user of one or more selections from the list of suggestions; and registering the selections as topics.
12. The method of clause 1, wherein a ranking module further transmits the output to a classification A.I., receiving from the classification A.I., a determination of how representative the output is compared to the rest of the outputs by checking if the topics aligns with the rest of the outputs, with the classification A.I. ranking the output the most to least representative or vice vera; it outputs the information based on the ranking of the outputs.
13. The method of clause 1, wherein a a share of voice percentage testing module calculates the percent of the time that each topic appears in the total output for a given prompt and the percent of the time that each topic appears in the outputs for all prompts.
14. The method of clause 1, wherein a repeating module sequentially repeats the process until all prompt variations are exhausted.
15. The method of clause 1, wherein the method is repeated at the after each process is concluded, repeating it at intervals.
16. The method of clause 1, wherein the output is stored the output in a cache for future use.
17. The method of clause 1, wherein an apparatus outputs the information for a user as a GUI.

Clause Set 2

1. A system for constructing a probeable output generative space 634 of an agent-under-test (AUT) 614 for a target input probe, comprising:

an agent sampling logic 612 configured to induce an agent-under-test (AUT) to disclose a plurality of outputs in response to processing a target input probe;

a space construction logic 626, having access to the plurality of outputs, and configured to construct a probeable output generative space 634 based on the plurality of outputs; and a space probing logic 632, having access to the probeable output generative space, and configured to probe the probeable output generative space for a query, and to make available results 622 of the probing for further analysis.

2. The system of clause 1, wherein the query requires identifying a distribution pattern of features associated with the target input probe.

3. The system of clause 2, wherein the features include mentions, in the probeable output generative space, of the target input probe.

4. The system of clause 2, wherein the features include mentions, in the probeable output generative space, of one or more variations of the target input probe.

5. The system of clause 2, wherein the features include mentions, in the probeable output generative space, of concepts related to the target input probe.

6. The system of clause 2, wherein the distribution pattern includes frequencies at which the features occur in the probeable output generative space.

7. The system of clause 6, wherein the frequencies are determined by percentages.

8. The system of clause 2, wherein the distribution pattern includes priminalities at which the features occur in the probeable output generative space.

9. The system of clause 6, wherein the priminalities are determined by percentiles.

10. The system of clause 1, wherein the agent sampling logic is further configured to induce the AUT to disclose the plurality of outputs in response to iteratively processing the target input probe over multiple sequential instances.

11. The system of clause 10, wherein the agent sampling logic is further configured to induce the AUT to disclose the plurality of outputs in response to concurrently processing the target input probe over multiple parallel instances.

12. The system of clause 1, wherein the agent sampling logic is further configured to terminate the inducement of the AUT when a termination condition is satisfied.

13. The system of clause 1, wherein the query is designed prior to the inducement of the AUT and based on the target input probe.

14. The system of clause 13, wherein the query is designed after the inducement of the AUT and based on contents of the probeable output generative space.

15. The system of clause 4, wherein the agent sampling logic is further configured to induce the AUT to disclose the plurality of outputs in response to processing the target input probe and the variations of the target input probe.

16. The system of clause 1, wherein the AUT is a large language model (LLM).

What is claimed is:

1. A system for constructing a probeable output generative space of an agent-under-test (AUT) for a target input probe, comprising:

an agent sampling logic configured to induce an agent-under-test (AUT) to disclose a plurality of outputs in response to processing a target input probe;

a space construction logic, having access to the plurality of outputs, and configured to construct a probeable output generative space based on the plurality of outputs;

a space probing logic, having access to the probeable output generative space, and configured to probe the probeable output generative space for a query, and to make available results of the probing for further analysis;

wherein the AUT is a large language model (LLM), wherein the LLM can be trained with minimal queries; and wherein the agent sampling logic is further configured to induce the AUT to disclose the plurality of outputs in response to concurrently processing the target input probe over multiple parallel instances.

2. The system of claim 1, wherein the query requires identifying a distribution pattern of features associated with the target input probe.

3. The system of claim 2, wherein the features include mentions, in the probeable output generative space, of the target input probe.

4. The system of claim 2, wherein the features include mentions, in the probeable output generative space, of one or more variations of the target input probe.

5. The system of claim 4, wherein the agent sampling logic is further configured to induce the AUT to disclose the plurality of outputs in response to processing the target input probe and the variations of the target input probe.

6. The system of claim 2, wherein the features include mentions, in the probeable output generative space, of concepts related to the target input probe.

7. The system of claim 2, wherein the distribution pattern includes frequencies at which the features occur in the probeable output generative space.

8. The system of claim 7, wherein the frequencies are determined by percentages.

9. The system of claim 2, wherein the distribution pattern includes priminalities at which the features occur in the probeable output generative space.

10. The system of claim 9, wherein the priminalities are determined by percentiles.

11. The system of claim 1, wherein the agent sampling logic is further configured to induce the AUT to disclose the plurality of outputs in response to iteratively processing the target input probe over multiple sequential instances.

12. The system of claim 1, wherein the agent sampling logic is further configured to terminate the inducement of the AUT when a termination condition is satisfied.

13. The system of claim 1, wherein the query is designed prior to the inducement of the AUT and based on the target input probe.

14. The system of claim 13, wherein the query is designed after the inducement of the AUT and based on contents of the probeable output generative space.

* * * * *